United States Patent
Miyoshi et al.

(10) Patent No.: US 9,416,199 B2
(45) Date of Patent: *Aug. 16, 2016

(54) METHOD FOR PRODUCING ALKALI CELLULOSE

(75) Inventors: Eisuke Miyoshi, Wakayama (JP); Yutaka Yoshida, Wakayama (JP); Ryo Miyasato, Wakayama (JP); Kenichi Shiba, Wakayama (JP); Rui Takahashi, Wakayama (JP); Yoichiro Imori, Wakayama (JP)

(73) Assignee: KAO CORPORATION, Tokyo (JP)

( * ) Notice: Subject to any disclaimer, the term of this patent is extended or adjusted under 35 U.S.C. 154(b) by 100 days.

This patent is subject to a terminal disclaimer.

(21) Appl. No.: 14/115,212

(22) PCT Filed: Apr. 27, 2012

(86) PCT No.: PCT/JP2012/061476
§ 371 (c)(1),
(2), (4) Date: Nov. 1, 2013

(87) PCT Pub. No.: WO2012/150700
PCT Pub. Date: Nov. 8, 2012

(65) Prior Publication Data
US 2014/0073773 A1    Mar. 13, 2014

(30) Foreign Application Priority Data
May 2, 2011   (JP) ................. 2011-103310

(51) Int. Cl.
| | | |
|---|---|---|
| C08B 15/00 | (2006.01) | |
| C08B 1/06 | (2006.01) | |
| C08B 1/08 | (2006.01) | |
| C08B 11/08 | (2006.01) | |
| C08H 8/00 | (2010.01) | |
| C08L 1/26 | (2006.01) | |

(52) U.S. Cl.
CPC . *C08B 15/00* (2013.01); *C08B 1/06* (2013.01); *C08B 1/08* (2013.01); *C08B 11/08* (2013.01); *C08H 8/00* (2013.01); *C08L 1/26* (2013.01)

(58) Field of Classification Search
None
See application file for complete search history.

(56) References Cited

U.S. PATENT DOCUMENTS

| | | | |
|---|---|---|---|
| 3,322,748 A | 5/1967 | Tokimatsu et al. | |
| 2002/0099203 A1* | 7/2002 | Kobayashi | C08B 1/06 536/84 |
| 2003/0013871 A1 | 1/2003 | Mallon et al. | |
| 2010/0274001 A1 | 10/2010 | Okutsu et al. | |

FOREIGN PATENT DOCUMENTS

| | | |
|---|---|---|
| EP | 1734055 A2 | 12/2006 |
| JP | 151735 C2 | 9/1941 |
| JP | 38-4800 B | 4/1963 |
| JP | 42-800 B1 | 1/1967 |
| JP | 46-43103 B1 | 12/1971 |
| JP | 2009/102587 A | 5/2009 |
| JP | 2009/114375 A | 5/2009 |
| JP | 2009-143997 A | 7/2009 |
| JP | 2009-173869 A | 8/2009 |
| JP | 2010-106197 A | 5/2010 |
| JP | 2011-37924 A | 2/2011 |

OTHER PUBLICATIONS

Definition of "Cellulose", CHEMnetBASE; http://poly.chemnetbase.com/entry.do?id=3419&exno=3419&method=view&si=POLY; last viewed Sep. 3, 2015.*
Extended European Search Report, dated Feb. 26, 2015, for European Application No. 12779362.8.
U.S. Appl. No. 14/115,252, filed Nov. 1, 2013.
Machine English translation for JP-42-000800-B1 dated Jan. 17, 1967.
Machine English translation for JP-46-043103-B1 dated Dec. 20, 1971.

* cited by examiner

*Primary Examiner* — Layla Berry
*Assistant Examiner* — Bahar Craigo
(74) *Attorney, Agent, or Firm* — Birch, Stewart, Kolasch & Birch, LLP

(57) ABSTRACT

The present invention relates to a method for producing an alkali cellulose with suppressed decrease in the degree of polymerization as well as with small use amount of a basic compound, and to a method for producing a cellulose ether by using the alkali cellulose thus obtained. Provided by the present invention are: (A) a method for producing an alkali cellulose, comprising Step 1 wherein a cellulose-containing raw material is pulverized in the presence of 0.6 to 1.5 mol of a basic compound relative to 1 mol of an anhydroglucose unit that constitutes a cellulose in the said cellulose-containing raw material and under the condition in which the water content therein relative to the cellulose in the cellulose-containing raw material is 10% or less by mass thereby obtaining a cellulose powder mixture having the median diameter of the cellulose-containing raw material made 150 μm or less and Step 2 wherein water content therein is adjusted in the range of 30 to 100% by mass relative to the cellulose by adding water to the cellulose powder mixture thereby obtaining the alkali cellulose in the powder form; and (B) a method for producing a cellulose ether by reacting the alkali cellulose produced by the foregoing production method with an etherification agent.

14 Claims, 1 Drawing Sheet

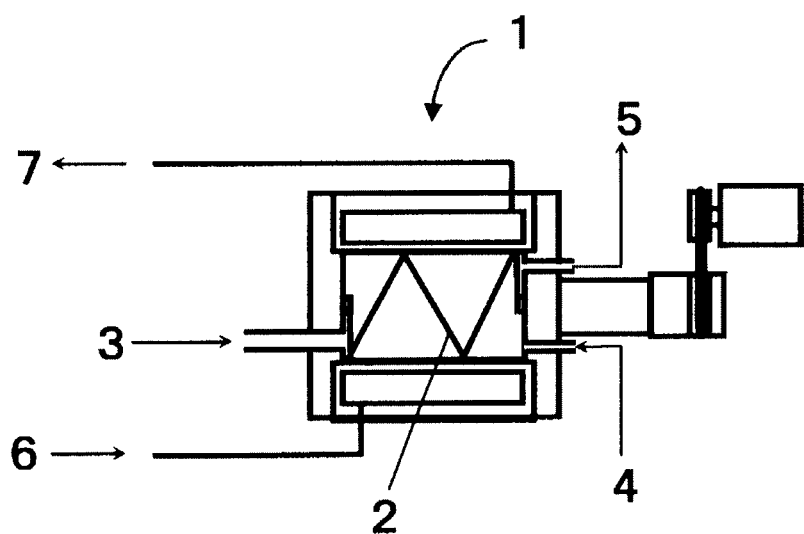

METHOD FOR PRODUCING ALKALI CELLULOSE

TECHNICAL FIELD

The present invention relates to a method for producing an alkali cellulose and to a method for producing a cellulose ether.

BACKGROUND ART

A cellulose ether is widely used as an ingredient for cleaning compositions such as a shampoo, a rinse, a treatment, and a conditioner, as well as a dispersing agent, a modifier, a flocculant, and so forth. A cellulose that is a raw material for producing cellulose ether is highly crystalline with poor reactivity, so that it is necessary to lower its crystallinity and improve its reactivity in production of the cellulose ether.

Accordingly, in a generally used production method of the cellulose ether, a cellulose is activated by a so-called alcell process or mercerization process in which a cellulose, a large quantity of water, and a large excess of an alkaline metal hydroxide are mixed as a slurry state of them to form an alkali cellulose, which is then subjected to an etherification reaction.

However, in this method, a large quantity of salt is by-produced from this large excess of the alkaline metal hydroxide used in the alcell process; and thus, the purification burden to remove this by-produced salt becomes a problem. Accordingly, methods for producing an alkali cellulose or a cellulose derivative with which the amount of the alkaline metal hydroxide is aimed to be reduced have been proposed.

For example, in Patent Document 1, a method for producing an alkali cellulose wherein a sodium hydroxide solution having a comparatively high concentration of 30 to 70% is supplied by spraying it as a mist to a pulp having the size of 60 to 80 mesh thereby effecting mixing and reacting them is disclosed.

In Patent Document 2, a method for producing an alkali cellulose wherein a mixture of an easily pulverizable cellulose and a solid sodium hydroxide is pulverized so that decrease in the degree of polymerization during storage becomes small is disclosed.

In Patent Document 3, a method for producing an alkali cellulose wherein an alkali-substitution is done effectively by a mechanical treatment in the presence of a basic compound and water thereby having the substituent group uniformly dispersed is disclosed.

In Patent Document 4, a method for producing a cellulose derivative wherein a powder cellulose with low crystallinity is reacted with glycidol in the presence of a catalyst is disclosed. In Patent Document 5, a method for producing a cationized cellulose wherein a powder cellulose with low crystallinity is reacted with a glycidyl trialkyl ammonium salt in the presence of a catalyst is disclosed.

Patent Document 1: Japanese Patent Application Publication No. S38-4800
Patent Document 2: Japanese Patent Application Publication No. S42-800
Patent Document 3: Japanese Patent Laid-Open Publication No. 2011-37924
Patent Document 4: Japanese Patent Laid-Open Publication No. 2009-114375
Patent Document 5: Japanese Patent Laid-Open Publication No. 2009-102587

SUMMARY OF THE INVENTION

The present invention relates to the following (A) and (B).
(A) A method for producing an alkali cellulose comprising the following Step 1 and Step 2.

Step 1: A cellulose-containing raw material is pulverized in the presence of 0.6 to 1.5 mol of a basic compound relative to 1 mol of an anhydroglucose unit that constitutes a cellulose in the said cellulose-containing raw material and under the condition in which the water content therein relative to the cellulose in the cellulose-containing raw material is 10% or less by mass thereby obtaining a cellulose powder mixture having the median diameter of the cellulose-containing raw material made 150 μm or less.

Step 2: Water content in the cellulose powder mixture obtained in Step 1 is adjusted in the range of 30 to 100% by mass relative to the cellulose in the cellulose-containing raw material used in Step 1 by adding water to the cellulose powder mixture obtained in Step 1 thereby obtaining an alkali cellulose in the powder form.

(B) A method for producing a cellulose ether, wherein the alkali cellulose produced by the production method according to (A) is reacted with an etherification agent.

BRIEF DESCRIPTION OF THE DRAWING

FIG. 1 shows a schematic drawing of a reactor part of the ribbon mixer type reacting apparatus used in Example 16.

MODE FOR CARRYING OUT THE INVENTION

The method of Patent Document 1 intends to reduce the amount of a large excess of an alkaline metal hydroxide used in the alcell process; but its effect is insufficient.

In Patent Document 2, a large excess of sodium hydroxide is used similarly to conventional alcell processes.

In the methods of Patent Documents 3, 4, and 5, although the use amount of a metal hydroxide could be reduced during the alcell process, it became apparent that there is a problem of decrease in the degree of polymerization of the cellulose during the time of easing the cellulose crystal structure.

The present invention relates to a method for producing an alkali cellulose with small decrease in the degree of polymerization of the cellulose as well as with small use amount of a base, and to a method for producing a cellulose ether by using the alkali cellulose thus obtained.

That is, the present invention relates to the following (A) and (B).

(A) A method for producing an alkali cellulose comprising the following Step 1 and Step 2.

Step 1: A cellulose-containing raw material is pulverized in the presence of 0.6 to 1.5 mol of a basic compound relative to 1 mol of an anhydroglucose unit that constitutes a cellulose in the said cellulose-containing raw material and under the condition in which the water content therein relative to the cellulose in the cellulose-containing raw material is 10% or less by mass thereby obtaining a cellulose powder mixture having the median diameter of the cellulose-containing raw material made 150 μm or less.

Step 2: Water content in the cellulose powder mixture obtained in Step 1 is adjusted in the range of 30 to 100% by mass relative to the cellulose in the cellulose-containing raw material used in Step 1 by adding water to the cellulose powder mixture obtained in Step 1 thereby obtaining an alkali cellulose in the powder form.

(B) A method for producing a cellulose ether, wherein the alkali cellulose produced by the production method according to (A) is reacted with an etherification agent.

According to the method for producing an alkali cellulose of the present invention, an alkali cellulose can be produced efficiently by using the reduced amount of a basic compound while suppressing decrease in the degree of polymerization of the cellulose. In addition, a cellulose ether can be produced efficiently by using the alkali cellulose thus obtained.

Method for Producing the Alkali Cellulose

The method for producing the alkali cellulose of the present invention comprises the following Step 1 and Step 2.

Step 1: A cellulose-containing raw material is pulverized in the presence of 0.6 to 1.5 mol of a basic compound relative to 1 mol of an anhydroglucose unit that constitutes a cellulose in the said cellulose-containing raw material and under the condition in which the water content therein relative to the cellulose in the cellulose-containing raw material is 10% or less by mass thereby obtaining a cellulose powder mixture having the median diameter of the cellulose-containing raw material made 150 μm or less.

Step 2: Water content in the cellulose powder mixture obtained in Step 1 is adjusted in the range of 30 to 100% by mass relative to the cellulose in the cellulose-containing raw material used in Step 1 by adding water to the cellulose powder mixture obtained in Step 1 thereby obtaining an alkali cellulose in the powder form.

Hereinafter, each Step, raw materials to be used, and so forth will be explained in detail.

Step 1

In Step 1, a cellulose-containing raw material is pulverized in the presence of 0.6 to 1.5 mol of a basic compound relative to 1 mol of an anhydroglucose unit that constitutes the cellulose in the said cellulose-containing raw material and under the condition in which the water content therein relative to the cellulose in the cellulose-containing raw material is 10% or less by mass thereby obtaining a cellulose powder mixture having the median diameter of the cellulose-containing raw material made 150 μm or less.

In Step 1, the cellulose-containing raw material is pulverized together with a basic compound under the condition of substantial absence of water so that the basic compound can be uniformly dispersed in the cellulose-containing raw material after pulverization. In addition, the pulverization can be done efficiently by carrying out the pulverization under the condition of substantial absence of water; and as a result, decrease in the degree of polymerization of the cellulose in the cellulose-containing raw material during the time of pulverization can be suppressed.

Cellulose-Containing Raw Material:

The cellulose-containing raw material used in the present invention contains an α-cellulose with the amount thereof in the said raw material being preferably 20% or more by mass, more preferably 40% or more by mass, still more preferably 60% or more by mass, or further still more preferably 75% or more by mass. The upper limit of the α-cellulose content is 100% by mass. Meanwhile, the α-cellulose content can be obtained by the following calculation equation (1) by using the alkali-soluble values S10 (20° C.) and S18 (20° C.) obtained by ISO 692.

$$\alpha\text{-Cellulose Content (\% by mass)}=100-(S18+S10)/2 \quad (1)$$

In the case of a pulp, the α-cellulose content is generally in the range of 75 to 99% by mass with the rest being, in addition to water, very small amounts of a cellulose of a low degree of polymerization, a hemicellulose, a lignin, and so forth. Content of the cellulose of a low degree of polymerization is very small in a commercially available pulp that is obtained by digesting and bleaching the wooden material; and thus, it can be assumed that in the pulp the cellulose content is almost equal to the α-cellulose content.

The average degree of polymerization of the cellulose in the cellulose-containing raw material (hereinafter this cellulose is sometimes referred to as "raw material cellulose") does not influence the production method of the present invention; and thus, it is not particularly restricted. However, the characteristic of the production method of the present invention resides in that the decrease in the degree of polymerization during the time of producing the alkali cellulose is small, so that the production method of the present invention expresses an eminent effect especially when an alkali cellulose or a cellulose ether having high average degree of polymerization is desired.

In view of this point, the average degree of polymerization of the raw material cellulose is preferably 100 or more, and in view of easiness in its availability preferably 10000 or less. The average degree of polymerization of the raw material cellulose is more preferably in the range of 200 to 5000, still more preferably in the range of 500 to 3000, or further still more preferably in the range of 1000 to 2000.

In the present invention, the average degree of polymerization means the viscosity-average degree of polymerization measured by the copper-ammonia method; and specifically, it is calculated according to the method that is described in EXAMPLES.

The cellulose is composed of the crystalline portion and the amorphous portion, wherein the ratio of the crystalline portion in the raw material cellulose, i.e., the crystallinity, is not particularly restricted. However, the lowering treatment of the cellulose crystallinity is usually accompanied with decrease in the degree of polymerization as a consequence of breakage of the cellulose chain. In order to obtain the alkali cellulose or the cellulose ether having a high average degree of polymerization as mentioned above, the cellulose-containing raw material which contains the cellulose having the degree of polymerization less decreased, that is, having not being subjected to the crystallinity-lowering treatment or, if subjected to the lowering process, the time thereof being short, in other words, the cellulose-containing raw material which contains the cellulose having a high crystallinity, is preferably used. On the other hand, the cellulose-containing raw material having an extremely high crystallinity of more than 95% is not easily available. Accordingly, crystallinity of the raw material cellulose is preferably in the range of 10 to 95%, more preferably in the range of 20 to 95%, still more preferably in the range of 50 to 90%, or even still more preferably in the range of 60 to 80%.

In the present invention, crystallinity of the cellulose means the crystallinity derived from the I-type crystal structure of the raw material cellulose; and it is obtained by the following calculation equation (2) from the result of the X-ray crystal diffraction measurement.

$$\text{Crystallinity (\%)}=\{(I_{22.6}-I_{18.5})/I_{22.6}\}\times 100 \quad (2)$$

(In the equation, $I_{22.6}$ shows the diffraction intensity in the lattice plane (002 plane) of the cellulose I-type crystal in the X-ray diffraction (diffraction angle 2θ=22.6°), and $I_{18.5}$ shows the diffraction intensity of the amorphous portion (diffraction angle 2θ=18.5°).)

There exists also a little bit of the amorphous portion in the commercially available pulp or powder cellulose; and thus, the crystallinity thereof according to the calculation equation (2) is in the range of about 60% to about 80%.

Kind of the cellulose-containing raw material is not particularly restricted. Illustrative example thereof includes various wooden chips; pulps such as a wooden pulp produced from a wooden material and a cotton linter pulp obtained from fibers around the cotton seeds; papers such as a news paper, a carton box, a magazine, and a high quality paper; a plant stem and leaf such as a rice straw and a corn stem; and plant shells such as a rice husk, a palm shell, and a coconut shell. Among them, a pulp is preferable in view of the cellulose purity, the degree of polymerization, and the easy availability.

Form of the cellulose-containing raw material is not particularly restricted so far as there is no problem in charging it into the pulverization apparatus that will be mentioned later; but from the operational view point the cellulose-containing raw material in the sheet form, the cellulose-containing raw material in the pellet or chip form obtained by cutting or roughly pulverizing the cellulose-containing raw material in the sheet form, and the cellulose-containing raw material in the powder form obtained by fine pulverization are preferable. Among them, the cellulose-containing raw material in the chip form is preferable in view of the use of the cellulose raw material having a higher degree of polymerization as well as because of the easy operation thereof.

The cellulose-containing raw material in the chip form may be obtained by using a shredder (such as MSX2000-IVP440F (trade name) manufactured by MEIKO SHOKAI CO., LTD.) or a sheet pelletizer (such as SGG-220 (trade name) manufactured by HORAI CO, LTD.)

Size of the chips of the cellulose-containing raw material in the chip form is preferably in the range of 0.6 to 100 mm square, more preferably in the range of 0.8 to 30 mm square, or still more preferably in the range of 1 to 10 mm square, in view of more efficient pulverization of the chips. By cutting or roughly pulverizing the cellulose-containing raw material in the sheet form to the size within the range as mentioned above, the drying operation that may be done as necessary can be done efficiently, and in addition, the load during the pulverization can be reduced.

Water content in the cellulose-containing raw material is 10% or less by mass relative to the raw material cellulose because the pulverization mentioned later needs to be done under the state of substantially absence of water in order to suppress the decrease in the degree of polymerization of the raw material cellulose. The lower limit of the water content is 0% by mass relative to the raw material cellulose; however, because it is difficult to achieve the water content of 0% by mass in the cellulose-containing raw material, the water content therein is preferably in the range of 0.01 to 10% by mass, more preferably in the range of 0.1 to 7% by mass, or still more preferably in the range of 1 to 6% by mass, relative to the raw material cellulose. Even if the water content in the cellulose-containing raw material is more than the foregoing range, this can be used by carrying out a heretofore known drying operation prior to pulverization thereby adjusting the water content in the system during the pulverization mentioned later within the range mentioned later.

Water content in the cellulose-containing raw material may be measured by using a commercially available infrared moisture determination balance; and specifically, the measurement thereof can be done by the method described in EXAMPLES.

Basic Compound:

Illustrative example of the basic compound used in Step 1 includes alkaline metal hydroxides such as sodium hydroxide, potassium hydroxide, and lithium hydroxide; alkaline earth metal hydroxides such as magnesium hydroxide and calcium hydroxide; and tertiary amines such as trimethyl amine and triethyl amine. Among them, alkaline metal hydroxides or alkaline earth metal hydroxides are preferable; alkaline metal hydroxides are more preferable; and sodium hydroxide and potassium hydroxide are still more preferable. These basic compounds may be used solely or in a combination of two or more kinds of them.

Amount of the basic compound during pulverization is in the range of 0.6 to 1.5 mol relative to 1 mol of the anhydroglucose unit (hereinafter this unit is sometimes referred to as "AGU") that constitutes the raw material cellulose. When adding amount of the basic compound is 0.6 or more by mol relative to 1 mol of the AGU that constitutes the raw material cellulose (hereinafter this unit is sometimes referred to as "AGU of the raw material cellulose"), the alkali cellulose can be produced promptly in Step 2. Because of this, amount of the basic compound during pulverization is preferably 0.7 or more by mol, or more preferably 0.8 or more by mol, relative to 1 mol of the AGU of the raw material cellulose. When adding amount of the basic compound is 1.5 or less by mol relative to 1 mol of the AGU of the raw material cellulose, the yield of the reaction (based on an etherification agent) during the later-mentioned reaction between the alkali cellulose and an etherification agent (hereinafter this reaction is sometimes referred to as "etherification reaction") is high; and in addition, amount of the formed salt is small even if neutralization is done after completion of the reaction, so that a purification step may be omitted, or the purification load may be reduced even if purification is done. From this view point, amount of the basic compound during pulverization is preferably 1.3 or less by mol, or more preferably 1.2 or less by mol, relative to 1 mol of the AGU of the raw material cellulose. From the view point as mentioned above, amount of the basic compound during pulverization is preferably in the range of 0.7 to 1.3 mol, or more preferably in the range of 0.8 to 1.2 mol, relative to 1 mol of the AGU of the raw material cellulose.

The method to add the basic compound is not particularly restricted; and thus, it may be added either all at once or by a split addition. In the case that the basic compound is added all at once, in order to uniformly disperse the basic compound into the cellulose-containing raw material, it is preferable to add the basic compound into the cellulose-containing raw material followed by stirring and mixing the resulting mixture or to add and mix the basic compound while stirring the cellulose-containing raw material.

The basic compound may be added in the apparatus in which pulverization is carried out as mentioned later, or in the separate apparatus in which stirring and mixing are carried out.

The apparatus in which stirring and mixing are carried out is not particularly restricted so far as the basic compound can be dispersed into the cellulose-containing raw material. Illustrative example of the apparatus includes a ribbon-type mixer, a puddle-type mixer, and a conical planetary screw-type mixer; and a kneader to knead powders, a highly viscous substance, a resin, and so forth. Among them, a puddle mixer of a horizontal axis type is preferable; specifically Loedige Mixer, which is a puddle mixer of a horizontal axis type having a chopper blade (this is a mixer having a characteristic plough-shaped shovel which may be attached with a chopper blade, manufactured by Chuoh Kikoh), and a ploughshare mixer (this is a mixer having two functions, i.e., float dispersion mixing by a shovel blade having a unique shape and high speed shear dispersion by multi-stage chopper blades, manufactured by Pacific Machinery & Engineering Co., Ltd.) are especially preferable.

Form of the basic compound during the time of addition of the basic compound is not particularly restricted; but a solid state is preferable in view of the efficiency during later-mentioned pulverization. In the case that the basic compound is added in the solid state, the basic compound is preferably in the pellet form, granules, or powders in view of handling during production as well as uniform dispersion of the basic compound into the cellulose-containing raw material, though the basic compound is more preferably in the pellet or the granular form in view of operation. Meanwhile, that the basic compound is in the solid state does not mean that the compound does not contain water. The basic compound may contain water as a consequence of moisture absorption from an air and so forth.

Water Content:

Step 1 is carried out under the condition of 10% or less by mass of water content relative to the raw material cellulose.

When water content in the system to carry out Step 1 is 10% or less by mass relative to the raw material cellulose, pulverization can be done within a short period of time because the pulverization efficiency of the cellulose-containing raw material is high; and at the same time, decrease in the degree of polymerization of the raw material cellulose is small because breakage of the glucoside bond of the cellulose in the presence of the basic aqueous solution is suppressed. From this view point, water content in the system is preferably 7% or less by mass, or more preferably 6% or less by mass, relative to the raw material cellulose. The lower limit of the water content is 0% by mass. Because an extraordinary large cost is necessary in the operation to completely remove water from the cellulose-containing raw material, water content therein is preferably 0.01% or more by mass, more preferably 0.1% or more by mass, or still more preferably 1% or more, relative to the raw material cellulose. Furthermore, water content relative to the raw material cellulose is preferably in the range of 0.01 to 10% by mass, more preferably in the range of 0.1 to 7% by mass, or still more preferably in the range of 1 to 6% by mass, in view of pulverization efficiency, suppression of decrease in the degree of polymerization, and operational cost.

Measurement of water content during pulverization in Step 1 may be done in the same way as the measurement of water content in the cellulose-containing raw material. Meanwhile, in the present invention, as to water content before pulverization or in the early time of pulverization especially when the basic compound is used in the pellet or the granular form, there is a possibility that water content is different depending on the part from which the sample is taken because the basic compound is not dispersed uniformly in the cellulose-containing raw material. Accordingly, in the present invention, the measured water content in the cellulose powder mixture after completion of pulverization in Step 1 is taken as the water content during pulverization in Step 1.

Pulverization:

The pulverization operation is the operation in which the cellulose-containing raw material is pulverized while the basic compound is dispersed as uniformly as possible into the pulverized cellulose-containing raw material thereby obtaining the cellulose powder mixture. By this pulverization, the cellulose powder mixture having the median diameter of the cellulose-containing raw material made 150 µm or less can be obtained. When the basic compound in the solid state is used as the basic compound, pulverization of the basic compound takes place simultaneously with pulverization of the cellulose-containing raw material.

If the median diameter of the cellulose-containing raw material in the cellulose powder mixture (hereinafter this is sometimes referred to as "powder cellulose") is 150 µm or less, conversion to the alkali cellulose in Step 2 takes place promptly. From this view point, the median diameter of the powder cellulose is preferably 130 µm or less, more preferably 120 µm or less, still more preferably 110 µm or less, further still more preferably 100 µm or less, or even further still more preferably 80 µm or less. On the other hand, if the median diameter of the powder cellulose is 10 µm or more, decrease in the degree of polymerization of the cellulose during pulverization is small, so that this size is preferable. From this view point, the median diameter of the powder cellulose is more preferably 20 µm or more, still more preferably 30 µm or more, further still more preferably 40 µm or more, or even further still more preferably 50 µm or more. To increase the rate and the yield of conversion to the alkali cellulose and to suppress the decrease in the degree of polymerization during pulverization, the median diameter of the powder cellulose is preferably in the range of 10 to 150 µm, more preferably in the range of 20 to 130 µm, still more preferably in the range of 30 to 120 µm, further still more preferably in the range of 30 to 110 µm, even further still more preferably in the range of 40 to 100 µm, or the utmost preferably in the range of 50 to 80 µm. The median diameter of the powder cellulose in the present invention may be measured by the method described in EXAMPLES.

The pulverizing machine to be used is not particularly restricted so far as it can pulverize the cellulose-containing raw material to the intended median diameter and can disperse the basic compound into the cellulose-containing raw material as uniformly as possible.

Specific example of the pulverizing machine includes roll mills such as a high pressure compression roll mill and a roll rotation mill; vertical roller mills such as a ring roller mill, a roller race mill, and a ball race mill; vessel-driven medium mills such as a rolling ball mill, a vibrating ball mill, a vibrating rod mill, a vibrating tube mill, a planetary ball mill, and a centrifugally fluidizing mill; medium-stirring mills such as a tower pulverizing machine, a stirring tank mill, a through-flow tank mill, and an annular mill; compressing shear mills such as a high-speed centrifugal roller mill and an angmill; and a mortar, a stone mill, a masscolloider, a Fret mill, an edge runner mill, a knife mill, a pin mill, and a cutter mill. Among them, in view of productivity as well as pulverization efficiency of the cellulose-containing raw material, vessel-driven medium mills and medium-stirring mills are preferable; vessel-driven medium mills are more preferable; vibrating mills such as a vibrating ball mill, a vibrating rod mill, and a vibrating tube mill are still more preferable; and a vibrating rod mill is further still more preferable.

As to the pulverization method, pulverization may be done by any of a batch-wise method and a continuous method.

Material of the apparatus and/or the medium used in pulverization is not particularly restricted; and illustrative example thereof includes iron, stainless steel, alumina, zirconia, silicon carbide, silicon nitride, and glass. From the view point of pulverization efficiency of the cellulose-containing raw material, iron, stainless steel, zirconia, silicon carbide, and silicon nitride are preferable; and in view of the industrial applicability, iron and stainless steel are more preferable.

From the view point of the pulverization efficiency of the cellulose-containing raw material, when the apparatus is a vibrating mill in which the medium thereof is a rod, the outer diameter of the rod is preferably in the range of 0.1 to 100 mm, or more preferably in the range of 0.5 to 50 mm. If size of the rod is within the foregoing range, downsizing of the powder cellulose to the intended particle diameter can be done efficiently; and in addition, there is no fear of contamination of the cellulose as a consequence of mixing of a spall and the like of the rod.

Preferable range of the filling ratio of the rod is different depending on the kind of the vibrating mill, but it is preferably in the range of 10 to 97%, or more preferably in the range of 15 to 95%. If the filling ratio is within this range, contact frequency of the cellulose-containing raw material with the rod is increased, and in addition, the pulverization efficiency can be enhanced without encumbering movement of the medium. Here, the filling ratio means an apparent volume of the rod relative to the volume of the stirring part of the vessel in the vibrating mill.

Temperature during pulverization is not particularly restricted; but in view of operational cost and suppression of the decrease in the degree of polymerization of the raw material cellulose, the temperature is preferably in the range of −100 to 200° C., more preferably in the range of 0 to 100° C., or still more preferably in the range of 30 to 70° C.

Time for pulverization may be adjusted appropriately such that the median diameter of the powder cellulose may become the intended value. Time for pulverization is different depending on the used pulverizing machine, the used energy amount, and so forth; but the time is usually in the range of 1 minute to 12 hours. In view of downsizing of the median diameter of the powder cellulose as well as suppression of the decrease in the degree of polymerization of the raw material cellulose, the time is preferably in the range of 5 minutes to 3 hours, more preferably in the range of 8 minutes to 1 hour, or still more preferably in the range of 10 to 30 minutes.

During pulverization, it is preferable to pulverize under an atmosphere of an inert gas such as nitrogen as appropriate in view of avoiding coloration and decrease in the degree of polymerization of the raw material cellulose.

Usually, the cellulose-containing raw material is in the form of fiber in the early stage of pulverization; and as the pulverization progresses, amount of the cellulose-containing raw material in the form of fiber decreases, while amount of the cellulose-containing raw material in the powder form increases. In addition, as amount of the cellulose-containing raw material in the form of fiber decreases, bulk density of the cellulose-containing raw material increases. Here, if amount of the cellulose-containing raw material in the powder form in the cellulose powder mixture is large, the rate and the yield of conversion to the alkali cellulose in Step 2 are high in proportion thereto. Accordingly, in order to efficiently convert to the alkali cellulose in Step 2 and to suppress the decrease in the degree of polymerization during pulverization, the bulk density of the cellulose powder mixture after pulverization is preferably in the range of 100 to 750 kg/m$^3$, more preferably in the range of 150 to 500 kg/m$^3$, or still more preferably in the range of 200 to 350 kg/m$^3$.

Step 2

In Step 2, water content in the cellulose powder mixture is adjusted in the range of 30 to 100% by mass relative to the cellulose in the cellulose-containing raw material used in Step 1 by adding water to the cellulose powder mixture obtained in Step 1 thereby obtaining the alkali cellulose in the powder form.

Water Content:

Water content in the cellulose powder mixture is adjusted in the range of 30 to 100% by mass relative to the cellulose (raw material cellulose) in the cellulose-containing raw material used in Step 1, so that a part or all of the raw material cellulose is converted to the alkali cellulose.

If water content after the adjustment is 30% or more by mass relative to the raw material cellulose, the alkali cellulose in the powder form having a high conversion index to the alkali cellulose (this will be mentioned later) is produced in high yield. From this view point, water content after the adjustment is preferably 35% or more by mass, or more preferably 40% or more by mass, relative to the raw material cellulose. On the other hand, if water content after the adjustment is 100% or less by mass to the raw material cellulose, the alkali cellulose in the powder form having a high conversion index to the alkali cellulose is produced in high yield, and in addition, the cellulose ether can be obtained in high yield (based on the etherification agent) by the later-mentioned etherification reaction. From this view point, water content after the adjustment is preferably 70% or less by mass, or preferably 60% or less by mass, relative to the raw material cellulose. In order to enhance the conversion index to the alkali cellulose, water content in the cellulose powder mixture is adjusted preferably in the range of 35 to 70% by mass, or more preferably in the range of 40 to 60% by mass, relative to the raw material cellulose.

In order to uniformly disperse water into the cellulose powder mixture, it is preferable to add water into the cellulose powder mixture followed by stirring and mixing the resulting mixture, or to add and mix water into the cellulose powder mixture while they are being stirred.

The apparatus to carry out the stirring and mixing is not particularly restricted so far as the apparatus can mix water with the cellulose powder mixture. Specific examples thereof are the same as those described in the paragraphs for stirring and mixing of the basic compound.

As to the method for addition of water, there is no particular restriction; and thus, water may be added either all at once or by a split addition. When water is added, spraying is preferable.

Aging:

In the present invention, in order to facilitate the rate of production of the alkali cellulose, it is preferable to carry out aging after the water content in the cellulose powder mixture is adjusted in the forgoing Step 2. In the present invention, aging means that the cellulose powder mixture after adjustment of water content is allowed to stand at a certain temperature for a prescribed period of time with or without stirring.

Temperature for aging is preferably 35° C. or higher, more preferably 38° C. or higher, still more preferably 40° C. or higher, or further still more preferably 50° C. or higher, in view of the rate of production of the alkali cellulose. On the other hand, temperature for aging is preferably 90° C. or lower, more preferably 80° C. or lower, still more preferably 75° C. or lower, or further still more preferably 70° C. or lower, in order to suppress the decrease in the degree of polymerization of the alkali cellulose. In view of the rate of production of the alkali cellulose as well as in order to keep the degree of polymerization, temperature for aging is preferably in the range of 35 to 90° C., more preferably in the range of 38 to 80° C., still more preferably in the range of 40 to 75° C., or further still more preferably in the range of 50 to 70° C.

As to the apparatus for aging, there is no particular restriction. Specific examples of the apparatus for aging are the same as those described in the paragraphs for stirring and mixing of the basic compound. In view of convenient operation, aging is preferably carried out in the same apparatus as the apparatus in which water is added to the cellulose powder mixture followed by stirring and mixing the resulting mixture.

Time for aging may be changed appropriately in accordance with the rate of converting to the alkali cellulose, because this rate changes depending on the temperature for aging, the median diameter of the powder cellulose, and so forth. Usually, increase in the conversion index to the alkali cellulose reaches saturation within 24 hours even at room temperature. Accordingly, in view of the productivity, time for aging, if it is carried out, is usually 24 or less hours, preferably 12 or less hours, more preferably 6 or less hours, or still more preferably 3 or less hours. In order to produce the alkali cellulose in the powder form having a high conversion index to the alkali cellulose in high yield (this index will be mentioned later), time for aging, if it is carried out, is 0.1 or more hours, preferably 0.2 or more hours, more preferably 0.5 or more hours, or still more preferably 1 or more hours. In view of the above, time for aging, if it is carried out, is usually in the range of 0.1 to 24 hours; and in view of the productivity as well as in order to adequately convert to the alkali cellulose, the time is preferably in the range of 0.2 to 12 hours, more preferably in the range of 0.5 to 6 hours, or still more preferably in the range of 1 to 3 hours.

Addition of the basic compound, addition of water, and aging as mentioned above are carried out preferably under an atmosphere of an inert gas such as nitrogen if necessary in order to avoid coloration of the alkali cellulose to be produced and to avoid decrease in the degree of polymerization of the powder cellulose as well as the alkali cellulose to be produced.

Alkali Cellulose:

In the above-mentioned Step 2, the alkali cellulose in the powder form is obtained as the mixture in the powder form (hereinafter, this mixture is sometimes referred to as "alkali cellulose-containing powder mixture"); and this mixture may be used, without or with performing purification as necessary by a heretofore known method, as a raw material for various cellulose derivatives to be obtained by the reaction with the alkali cellulose.

Conversion of the powder cellulose to the alkali cellulose in Step 2 may be observed by the X-ray crystal diffraction measurement.

In the alkali cellulose-containing powder mixture, there exist the alkali cellulose in the powder form and the powder cellulose not converted to the alkali cellulose. Accordingly, in the present invention, the ratio of the alkali cellulose in the powder form to the powder cellulose is conveniently expressed by the conversion index to the alkali cellulose obtained by the following calculation equation (3) from the result of the X-ray crystal diffraction measurement of the alkali cellulose-containing powder mixture.

$$\text{Conversion index to alkali cellulose} = 2.2805 \times \{I_{20.8}/(I_{20.8}+I_{22.6})\} - 0.54052 \quad (3)$$

(In the equation, $I_{22.6}$ shows the diffraction intensity in the crystal lattice plane (002 plane) of the cellulose I-type crystal in the X-ray diffraction (diffraction angle 2θ=22.6°) of the powder cellulose, and $I_{20.8}$ shows the diffraction intensity of the alkali cellulose (diffraction angle 2θ=20.8°).)

The conversion index to the alkali cellulose of the alkali cellulose-containing powder mixture is a number in the range of 0 to 1, wherein this index increases with increase of the ratio of the alkali cellulose.

According to the production method of the present invention, the alkali cellulose-containing powder mixture having a high conversion index to the alkali cellulose can be obtained while suppressing the decrease in the degree of polymerization of the powder cellulose.

The higher the conversion index to the alkali cellulose is, the more the amount of the alkali cellulose is in the alkali cellulose-containing powder mixture; and thus, the later-mentioned etherification reaction takes place uniformly. Accordingly, in the case that the conversion index to the alkali cellulose is high, for example when a hydrophilic etherification agent is used, sufficient amount of the hydrophilic ether group may be introduced; and as a result, solubility of the obtained cellulose ether to water becomes higher, so that amount of insoluble matters may become smaller.

Method for Producing the Cellulose Ether

The method for producing the cellulose ether according to the present invention is characterized in that the alkali cellulose obtained by the above-mentioned method of the present invention is reacted with an etherification agent. By choosing various etherification agents for the reaction, various cellulose ethers can be obtained efficiently.

Etherification Agent:

As to the etherification agent used in the present invention, various etherification agents that are the raw materials for heretofore known cellulose ethers may be used so far as the agent is a compound having a reactive site to react with the alkali cellulose so that the cellulose ether may be producible. As to the etherification agent like this, the etherification agent shown by the following general formula (I), which has, as the reactive site with the alkali cellulose, an epoxy group or a halogen atom, may be mentioned.

$$W\text{---}Y \quad (I)$$

(In the formula, W represents an epoxy group or a halogen atom. Y represents a hydrogen atom or a hydrocarbon group having 1 to 18 carbon atoms optionally substituted by at least one substituent group selected from a group shown by the following general formula (II), a sulfo group, a hydroxyl group, a carboxy group, a cyano group, and an alkoxy group having 1 to 18 carbon atoms. However, this excludes the case that W is a halogen atom while Y is a hydrogen atom.)

[Chem. 1]

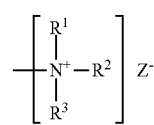

(In the formula, each of $R^1$ to $R^3$ independently represents a hydrocarbon group having 1 to 3 carbon atoms, and $Z^-$ represents an atom or a group having a monovalent negative charge.)

In the general formula (I), the hydrocarbon group of Y having 1 to 18 carbon atoms is preferably a linear or a branched aliphatic hydrocarbon group whose carbon number is preferably in the range of 1 to 10, more preferably in the range of 1 to 6, or still more preferably in the range of 1 to 3, in view of solubility of the cellulose ether obtained in the present invention into a polar solvent.

As to the alkoxy group of Y having 1 to 18 carbon atoms, an aliphatic alkoxy group having a linear or a branched hydrocarbon chain is preferable in view of solubility into the foregoing polar solvent.

The sulfo group and the carboxy group of Y is preferably a salt with an alkaline metal in view of storage stability of the etherification agent.

As to the hydrocarbon group having 1 to 3 carbon atoms of $R^1$ to $R^3$ in the general formula (II), a methyl group is particularly preferable in view of easy availability of the raw material thereof.

As to the $Z^-$ in the general formula (II), an inorganic ion such as a halogenated compound ion and organic ions such as an alkyl sulfate ion and an aliphatic acid ion may be mentioned, though a halogenated compound ion and an alkyl sulfate ion having 1 to 3 carbon atoms are preferable in view of the water solubility of the cellulose ether to be obtained in the present invention, while a halogenated compound ion is more preferable.

Illustrative example of the halogenated compound ion includes a chloride ion, a bromide ion, and an iodide ion; however, in view of chemical stability and easy availability, a chloride ion and a bromide ion are preferable, though a chloride ion is more preferable.

In the case that W is a halogen atom, in view of storage stability of the etherification agent, W is preferably chlorine or bromine, though W is more preferably chlorine.

Specific example of the etherification agent shown by the general formula (I) includes (i) an epoxy alkane, (ii) an alkyl glycidyl ether, (iii) a halogenated alkyl, (iv) an alkyl halohydrin ether, (v) a compound having a sulfo group and an epoxy group, (vi) a compound having a hydroxyl group and an epoxy group, (vii) a compound having a halogen atom and a carboxy group, (viii) a compound having a halohydrin group, (ix) a compound having a sulfo group and a halohydrin group, (x) a compound having a halohydrin group and a hydroxyl group other than the halohydrin group, (xi) a compound having a group shown by the general formula (II) and an epoxy group, (xii) a compound having a group shown by the general formula (II) and a halogen atom, and (xiii) a compound having a group shown by the general formula (II) and a halohydrin group.

Illustrative example of (i) the epoxy alkane includes epoxy alkanes having 2 to 20 carbon atoms such as ethylene oxide, propylene oxide, butylene oxide, 1,2-epoxy hexane, 1,2-epoxy octane, 1,2-epoxy decane, 1,2-epoxy dodecane, and 1,2-epoxy octadecane.

Illustrative example of (ii) the alkyl glycidyl ether includes alkyl glycidyl ethers which contain an alkyl group having 1 to 18 carbon atoms, such as methyl glycidyl ether, ethyl glycidyl ether, propyl glycidyl ether, n-pentyl glycidyl ether, isopentyl glycidyl ether, n-octyl glycidyl ether, 2-ethylhexyl glycidyl ether, n-decyl glycidyl ether, isodecyl glycidyl ether, lauryl glycidyl ether, cetyl glycidyl ether, stearyl glycidyl ether, and isostearyl glycidyl ether.

Illustrative example of (iii) the halogenated alkyl includes halogenated alkyls having 1 to 18 carbon atoms, such as methyl chloride, ethyl chloride, ethyl bromide, octyl chloride, and stearyl chloride.

Illustrative example of (iv) the alkyl halohydrin ether includes alkyl halohydrin ethers having 1 to 18 carbon atoms, such as 1-chloro-2-hydroxy-3-methoxypropane, 1-chloro-2-hydroxy-3-ethoxypropane, 1-chloro-2-hydroxy-3-propoxypropane, 1-chloro-2-hydroxy-3-butoxypropane, 1-chloro-2-hydroxy-3-octoxypropane, and 1-chloro-2-hydroxy-3-octadecyloxypropane.

Illustrative example of (v) the compound having a sulfo group and an epoxy group includes 1-sulfo-19,20-epoxy eicosane, 1-sulfo-9,10-epoxy decane, 1-sulfo-5,6-epoxy hexane, 1-sulfo-3,4-epoxy butane, glycidyl sulfonic acid, and a sodium or a potassium salt of them.

Illustrative example of (vi) the compound having a hydroxyl group and an epoxy group includes 1-hydroxy-19,20-epoxy eicosane, 1-hydroxy-9,10-epoxy decane, 1-hydroxy-5,6-epoxy hexane, 1-hydroxy-3,4-epoxy butane, and glycidol.

Illustrative example of (vii) the compound having a halogen atom and a carboxy group includes chloroacetic acid, 3-chloropropionic acid, 4-chlorobutanoic acid, 8-chlorooctanoic acid, 18-chlorostearic acid, and a sodium or a potassium salt of them.

Illustrative example of (viii) the compound having a halohydrin group includes 2-chloroethanol, 1-chloro-2-hydroxypropane, 1-chloro-2-hydroxybutane, 1-chloro-2-hydroxyhexane, 1-chloro-2-hydroxyoctane, 1-chloro-2-hydroxydecane, 1-chloro-2-hydroxydodecane, and 1-chloro-2-hydroxyoctadecane.

Illustrative example of (ix) the compound having a sulfo group and a halohydrin group includes 1-chloro-2-hydroxy-3-sulfoproapne, 1-chloro-2-hydroxy-4-sulfobutane, 1-chloro-2-hydroxy-6-sulfohexane, 1-chloro-2-hydroxy-12-sulfododecane, 1-chloro-2-hydroxy-18-sulfooctadecane, and a sodium or a potassium salt of them.

Illustrative example of (x) the compound having a halohydrin group and a hydroxyl group other than the halohydrin group includes 1-chloro-2,3-dihydroxypropane, 1-chloro-2,4-dihydroxybutane, and 1-chloro-2,18-dihydroxyoctadecane.

Illustrative example of (xi) the compound having a group shown by the general formula (II) and an epoxy group includes a chloride salt, a bromide salt, and a methylsulfate salt of 19,20-epoxyeicosane-1-trimethyl ammonium, 9,10-epoxydecane-1-trimethyl ammonium, 7,8-epoxyoctane-1-trimethyl ammonium, 5,6-epoxyhexane-1-trimethyl ammonium, 4,5-epoxypentane-1-trimethyl ammonium, 3,4-epoxybutane-1-trimethyl ammonium, glycidyl trimethyl ammonium, glycidyl triethyl ammonium, or glycidyl tripropyl ammonium.

Illustrative example of (xii) the compound having a group shown by the general formula (II) and a halogen atom includes a chloride salt, a bromide salt, and a methylsulfate salt of 1-chloromethane-1-trimethyl ammonium, 1-chloroethane-2-trimethyl ammonium, 1-chloropropane-3-trimethyl ammonium, 1-chlorobutane-4-trimethyl ammonium, 1-chlorohexane-6-trimethyl ammonium, and 1-chlorooctadecane-18-trimethyl ammonium.

Illustrative example of (xiii) the compound having a group shown by the general formula (II) and a halohydrin group includes a chloride salt, a bromide salt, and a methylsulfate salt of 1-chloro-2-hydroxypropane-3-trimethyl ammonium, 1-chloro-2-hydroxybutane-4-trimethyl ammonium, 1-chloro-2-hydroxyoctane-8-trimethyl ammonium, and 1-chloro-2-hydroxyoctadecane-18-trimethyl ammonium.

Among them, in view of reactivity and easy availability, preferable are (i) an epoxy alkane, (ii) an alkyl glycidyl ether, (iii) a halogenated alkyl, (iv) an alkyl halohydrin ether, (v) a compound having a sulfo group and an epoxy group, (vi) a compound having a hydroxyl group and an epoxy group, (vii) a compound having a halogen atom and a carboxy group, (ix) a compound having a sulfo group and a halohydrin group, (xi) a compound having a group shown by the general formula (II) and an epoxy group, and (xiii) a compound having a group shown by the general formula (II) and a halohydrin group; more preferable are (i) an epoxy alkane, (v) a compound having a sulfo group and an epoxy group, (vi) a compound having a hydroxyl group and an epoxy group, (vii) a compound having a halogen atom and a carboxy group, (ix) a compound having a sulfo group and a halohydrin group, (xi) a compound having a group shown by the general formula (II) and an epoxy group, and (xiii) a compound having a group shown by the general formula (II) and a halohydrin group; still more preferable are (i) epoxy alkanes having 2 to 5 carbon atoms such as ethylene oxide and propylene oxide, (v) sodium glycidyl sulfonate salt, (vi) glycidol, (vii) chloroacetic acid and sodium chloroacetate salt, (ix) sodium 1-chloro-2-hydroxy-3-sulfopropane salt, (xi) glycidyl trimethyl ammonium chloride salt, and (xiii) 1-chloro-2-hydroxypropane-3-trimethyl ammonium chloride salt; and further still more preferable are ethylene oxide, propylene oxide, glycidol, chloroacetic acid, sodium chloroacetate salt, glycidyl trimethyl ammonium chloride salt, and 1-chloro-2-hydroxypropane-3-trimethyl ammonium chloride salt.

These etherification agents may be used solely or in a combination of two or more kinds of them.

Amount of the etherification agent to be used is not restricted; and thus, it may be adjusted appropriately in accordance with the yield of the reaction as well as the intended amount of the ether group to be introduced. If the introduced amount of the ether group of the cellulose ether obtained by the method of the present invention is 0.001 or more by mol relative to 1 mol of AGU of the cellulose that constitutes the cellulose ether main chain, a high water solubility may be obtained, while if the amount thereof is 50 or less by mol, the reaction takes place in the etherification reaction with a high yield (based on the etherification agent). From this view point, the use amount of the etherification agent is preferably in the range of 0.001 to 50 mol, more preferably in the range of 0.005 to 10 mol, still more preferably in the range of 0.01 to 5 mol, or further still more preferably in the range of 0.1 to 3 mol, relative to total 1 mol of AGU of the raw material cellulose in the alkali cellulose-containing powder mixture used as the raw material for the esterification and of AGU that constitutes the cellulose skeleton of the alkali cellulose (hereinafter, this total AGU is sometimes referred to as "AGU of the alkali cellulose-containing powder mixture").

If the etherification agent has a halogen atom as the reaction site with the alkali cellulose of the present invention, a halogenated hydrogen is generated as the progress of the reaction thereby consuming the basic compound in the alkali cellulose-containing powder mixture. Accordingly, in the case that the etherification agent has a halogen atom as the reaction site with the alkali cellulose of the present invention and that the mol number of the added etherification agent is more than the mol number of the basic compound added in Step 1, it is preferable to add a basic compound during the time of the etherification reaction. The amount of the basic compound to be added is preferably in the range of 50 to 150% by mol, more preferably in the range of 80 to 120% by mol, or still more preferably in the range of 90 to 110% by mol, relative to the difference of the mol number between the etherification agent and the basic compound added in Step 1.

Also, if the etherification agent has an acidic functional group such as a carboxylic group, the basic compound in the alkali cellulose-containing powder mixture is consumed during addition of the etherification agent. Accordingly, also in the case that the etherification agent has an acidic functional group, it is preferable to add a basic compound during the time of the etherification reaction. The amount of the basic compound to be added is preferably in the range of 1 to 100% by mol, more preferably in the range of 10 to 99% by mol, or still more preferably in the range of 50 to 90% by mol, relative to the etherification agent.

Kind of the basic compound that can be added during the etherification reaction and preferable embodiments thereof are the same as the basic compounds and the preferable embodiments mentioned in the paragraphs regarding "Method for Producing the Alkali Cellulose". It is preferable to use the same basic compound as the basic compound used in production of the alkali cellulose.

Addition method of the etherification agent when it is added to the alkali cellulose-containing powder mixture is not particularly restricted; and thus, the agent may be added all at once, by a split addition, continuously, or in a combination of them. From the view point to efficiently disperse the etherification agent into the alkali cellulose-containing powder mixture, it is preferable that the etherification agent be added continuously or by a split addition while stirring the alkali cellulose-containing powder mixture. The state of the etherification agent during its addition is not particularly restricted either. If the etherification agent is in the liquid state, it may be used as it is, or it may be used after it is diluted with a good solvent such as water in order to improve handling thereof by reducing its viscosity and so forth.

Solvent:

The etherification reaction may be carried out also in the presence of a non-aqueous solvent in order to facilitate stirring of the mixture comprising the etherification agent and the alkali cellulose-containing powder mixture. By carrying out the etherification reaction in the presence of a non-aqueous solvent, water solubility of the cellulose ether thereby obtained may be enhanced.

Illustrative example of the non-aqueous solvent includes a secondary or a tertiary lower alcohol having 3 to 4 carbon atoms such as isopropanol and tert-butanol that are generally used in the reaction of an alkali cellulose and an etherification agent; a ketone having 3 to 6 carbon atoms such as acetone, methyl ethyl ketone, and methyl isobutyl ketone; an ether such as tetrahydrofuran, 1,4-dioxane, ethylene glycol dimethyl ether, and diethylene glycol dimethyl ether; and a non-protonic polar solvent such as acetonitrile and dimethyl sulfoxide.

Among them, in view of the reaction yield of the etherification reaction as well as the water solubility of the cellulose ether to be obtained, tert-butanol, isopropanol, tetrahydrofuran, ethylene glycol dimethyl ether, and acetonitrile are preferable; and in view of the safety of the non-aqueous solvent, tert-butanol, isopropanol, and ethylene glycol dimethyl ether are more preferable.

In view of water solubility of the cellulose ether to be obtained as well as productivity and reaction yield of the etherification agent, amount of these non-aqueous solvents to be used is preferably in the range of 1 to 100% by mass, more preferably in the range of 5 to 70% by mass, still more preferably in the range of 10 to 50% by mass, or particularly preferably in the range of 12 to 30% by mass, relative to the raw material cellulose in Step 1.

The state during the time of the reaction of the alkali cellulose with the etherification agent is preferably the slurry state or the flowable powder state that is not a highly viscous state or an agglomerated state.

Reaction Apparatus:

Illustrative example of the apparatus for the etherification reaction includes a mixer such as a high speed mixer and a Loedige Mixer capable of stirring and mixing the alkali cellulose-containing powder mixture and the etherification agent; and a so-called kneader used in kneading of powders, a highly viscous substance, a resin, and so on. In the case that the used etherification agent is in the gaseous state at the reaction temperature, apparatus for the etherification reaction is preferably a pressure-tight apparatus which is highly air tight and withstands the reaction under a pressurized condition.

Reaction Conditions:

Temperature during the etherification reaction may be appropriately adjusted in accordance with the reactivity of the etherification agent to be used and so forth; and thus, it is not particularly restricted. Temperature during the etherification reaction is preferably in the range of 0 to 200° C., more preferably in the range of 20 to 100° C., or still more preferably in the range of 30 to 80° C., in view of rate of the reaction as well as suppression of decomposition of the etherification agent or the alkali cellulose obtained by the production method of the present invention.

Time for the reaction may be appropriately adjusted in accordance with the reaction rate of the etherification agent, the intended amount of the ether group to be introduced, and the like. Time for the reaction is usually in the range of 0.1 to 72 hours; and in view of the reaction yield and the productivity of the etherification agent, it is preferably in the range of 0.2 to 36 hours, more preferably in the range of 0.5 to 18 hours, or still more preferably in the range of 1 to 12 hours.

Meanwhile, in order to avoid coloration and decrease in the degree of polymerization of the alkali cellulose of the present invention as well as of the cellulose ether to be obtained by the method of the present invention during the etherification reaction, the reaction is carried out preferably under an atmosphere of an inert gas such as nitrogen if necessary.

If the etherification agent is in the gaseous state under the reaction condition, the reaction is carried out preferably under the pressurized condition. The pressure may be adjusted appropriately by boiling point of the etherification agent and so forth. The pressure during the reaction is usually in the range of 0.001 to 10 MPa (gauge pressure); and in view of rate of the etherification reaction as well as burden to the apparatus, it is preferably in the range of 0.005 to 1 MPa (gauge pressure), or preferably in the range of 0.02 to 0.5 MPa (gauge pressure).

Post-Treatment:

After completion of the etherification reaction, the cellulose ether may also be isolated by heretofore known purification operations such as neutralization of the basic compound by an acid as necessary, and washing by water-containing isopropanol, water-containing acetone, or the like.

Production of cationized hydroxyethyl cellulose, cationized hydroxypropyl cellulose, and so on:

In the method for producing the cellulose ether of the present invention, if ethylene oxide is used as the etherification agent to react with the alkali cellulose obtained in the above-mentioned method, hydroxyethyl cellulose can be produced efficiently. Alternatively, if propylene oxide is used as the etherification agent, hydroxypropyl cellulose can be produced efficiently.

In addition, if the obtained hydroxypropyl cellulose or hydroxyethyl cellulose is reacted with an etherification agent containing a cationic group such as glycidyl trimethyl ammonium chloride and 1-chloro-2-hydroxypropane-3-trimethyl ammonium chloride, a cationized hydroxypropyl cellulose or a cationized hydroxyethyl cellulose can be produced.

The reaction temperature, the reaction time, the reaction apparatus, and preferable embodiments of them in the reaction of the etherification agent containing the foregoing cationic group with hydroxypropyl cellulose or hydroxyethyl cellulose are the same as the reaction temperature, the reaction time, the reaction apparatus, and the preferable embodiments of them in the before-mentioned etherification reaction.

As to the embodiments mentioned above, the present invention discloses the following production methods.

1. A method for producing an alkali cellulose comprising the following Step 1 and Step 2.

Step 1: A cellulose-containing raw material is pulverized in the presence of 0.6 or more to 1.5 or less by mol of a basic compound relative to 1 mol of an anhydroglucose unit that constitutes the cellulose in the said cellulose-containing raw material and under the condition in which water content therein relative to the cellulose in the cellulose-containing raw material is 10% or less by mass thereby obtaining a cellulose powder mixture having the median diameter of the cellulose-containing raw material made 150 µm or less.

Step 2: Water content in the cellulose powder mixture obtained in Step 1 is adjusted to 30 or more by mass and 100% or less by mass relative to the cellulose in the cellulose-containing raw material used in Step 1 by adding water to the cellulose powder mixture obtained in Step 1 thereby obtaining an alkali cellulose in the powder form.

2. The method for producing the alkali cellulose according to 1, wherein the basic compound during pulverization in Step 1 is one or more basic compounds selected from the group consisting of an alkaline metal hydroxide, an alkaline earth metal hydroxide, and an tertiary mine; preferably one or more basic compounds selected from the group consisting of an alkaline metal hydroxide and an alkaline earth metal hydroxide; more preferably one or more basic compounds selected from the group consisting of an alkaline metal hydroxide; or still more preferably one or more basic compounds selected from the group consisting of sodium hydroxide and potassium hydroxide.

3. The method for producing the alkali cellulose according to 1 or 2, wherein amount of the basic compound during pulverization in Step 1 is 0.7 or more by mol, or preferably 0.8 or more by mol, and 1.3 or less by mol, or preferably 1.2 or less by mol, relative to 1 mol of the anhydroglucose unit that constitutes the cellulose in the cellulose-containing raw material.

4. The method for producing the alkali cellulose according to any of 1 to 3, wherein amount of water during pulverization in Step 1 is 0% or more by mass, preferably 0.01% or more by mass, more preferably 0.1% or more by mass, or still more preferably 1% or more by mass, and 7% or less by mass, or preferably 6% or less by mass.

5. The method for producing the alkali cellulose according to any of 1 to 4, wherein the median diameter of the cellulose-containing raw material after pulverization in Step 1 is 10 µm or more, preferably 20 µm or more, more preferably 30 µm or more, still more preferably 40 µm or more, or further still more preferably 50 µm or more, and 130 µm or less, preferably 120 µm or less, more preferably 110 µm or less, still more preferably 100 µm or less, or further still more preferably 80 µm or less.

6. The method for producing the alkali cellulose according to any of 1 to 5, wherein amount of water in the cellulose powder mixture after addition of water in Step 2 is 35% or more by mass, or preferably 40% or more by mass, and 70% or less by mass, or preferably 60% or less by mass, relative to the cellulose in the cellulose-containing raw material used in Step 1.

7. The method for producing the alkali cellulose according to any of 1 to 6, wherein aging is carried out at 35° C. or higher and 90° C. or lower and for 0.1 or more hours and for 24 or less hours after addition of water in Step 2.

8. The method for producing the alkali cellulose according to 7, wherein temperature of the aging is 38° C. or higher, preferably 40° C. or higher, or more preferably 50° C. or higher, and 80° C. or lower, preferably 75° C. or lower, or more preferably 70° C. or lower.

9. The method for producing the alkali cellulose according to 7 or 8, wherein time for the aging is 0.2 or more hours, preferably 0.5 or more hours, or more preferably 1 or more hours, and 12 or less hours, preferably 6 or less hours, or more preferably 3 or less hours.

10. The method for producing the alkali cellulose according to any of 1 to 9, wherein bulk density of the cellulose powder mixture is 100 kg/m$^3$, preferably 150 kg/m$^3$, or more preferably 200 kg/m³, and 750 kg/m³ or less, preferably 500 kg/m³ or less, or more preferably 350 kg/m³ or less.

11. The method for producing the alkali cellulose according to any of 1 to 10, wherein water content in the cellulose-containing raw material in Step 1 is 0% or more by mass, preferably 0.01% or more by mass, more preferably 0.1% or more by mass, or still more preferably 1% or more by mass, and 10% or less by mass, preferably 7% or less by mass, or more preferably 6% or less by mass, relative to the cellulose.

12. The method for producing the alkali cellulose according to any of 1 to 11, wherein pulverization in Step 1 is carried out by using a pulverization apparatus; preferably a pulverization apparatus selected from the group consisting of a roll mill, a vertical roller mill, a vessel-driven medium mill, a medium-stirring mill, and a compressing shear mill; more preferably a vessel-driven medium mill or a medium-stirring mill; still more preferably a vessel-driven medium mill; further still more preferably a vibrating ball mill, a vibrating rod mill, or a vibrating tube mill; and particularly preferably a vibrating rod mill.

13. The method for producing the alkali cellulose according to any of 1 to 12, wherein the average degree of polymerization of the cellulose in the cellulose-containing raw material in Step 1 is 100 or more, preferably 200 or more, more preferably 500 or more, or still more preferably 1000 or more, and 10000 or less, preferably 5000 or less, more preferably 3000 or less, or still more preferably 2000 or less.

14. The method for producing the alkali cellulose according to any of 1 to 13, wherein crystallinity of the cellulose in the cellulose-containing raw material in Step 1 is 10% or more, preferably 20% or more, more preferably 50% or more, or still more preferably 60% or more, and 95% or less, preferably 90% or less, or more preferably 80% or less.

15. A method for producing a cellulose ether by reacting the alkali cellulose produced by the production method according to any of 1 to 14 with an etherification agent, preferably with an etherification agent shown by the following general formula (I).

$$W-Y \quad (I)$$

(In the formula, W represents an epoxy group or a halogen atom; Y represents a hydrogen or a hydrocarbon group having 1 to 18 carbon atoms optionally substituted by at least one substituent group selected from a group shown by the following general formula (II), a sulfo group, a hydroxyl group, a carboxy group, a cyano group, and an alkoxy group having 1 to 18 carbon atoms. However, this excludes the case that W is a halogen atom while Y is a hydrogen atom.)

[Chem. 2]

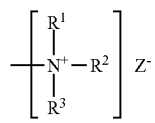

$$\left[ \begin{array}{c} R^1 \\ | \\ -N^+ - R^2 \\ | \\ R^3 \end{array} \right] Z^- \quad (II)$$

(In the formula, each of $R^1$ to $R^3$ independently represents a hydrocarbon group having 1 to 3 carbon atoms, and $Z^-$ represents an atom or a group having a monovalent negative charge.)

16. The method for producing the cellulose ether according to 15, wherein the carbon number of the hydrocarbon group in Y of the general formula (I) is 1 or more and 10 or less, preferably 6 or less, or more preferably 3 or less.

17. The method for producing the cellulose ether according to 15 or 16, wherein the sulfo group and the carboxy group in Y of the general formula (I) are salts of an alkaline metal.

18. The method for producing the cellulose ether according to 15 or 16, wherein the hydrocarbon group of $R^1$ to $R^3$ in the general formula (II) is a methyl group.

19. The method for producing the cellulose ether according to any of 15 to 18, wherein W in the general formula (I) is an epoxy group, a chlorine atom, or a bromine atom.

20. The method for producing the cellulose ether according to 15, wherein the etherification agent shown by the general formula (I) is one or more etherification agents selected from the group consisting of an epoxy alkane, an alkyl glycidyl ether, a halogenated alkyl, an alkyl halohydrin ether, a compound having a sulfo group and an epoxy group, a compound having a hydroxyl group and an epoxy group, a compound having a halogen atom and a carboxy group, a compound having a sulfo group and a halohydrin group, a compound having a group shown by the general formula (II) and an epoxy group, and a compound having a group shown by the general formula (II) and a halohydrin group; preferably one or more etherification agents selected from the group consisting of an epoxy alkane, a compound having a sulfo group and an epoxy group, a compound having a hydroxyl group and an epoxy group, a compound having a halogen atom and a carboxy group, a compound having a sulfo group and a halohydrin group, a compound having a group shown by the general formula (II) and an epoxy group, and a compound having a group shown by the general formula (II) and a halohydrin group; more preferably one or more etherification agents selected from the group consisting of an epoxy alkane having 2 to 5 carbon atoms, sodium glycidyl sulfonate salt, glycidol, chloroacetic acid, sodium chloroacetate salt, sodium 1-chloro-2-hydroxy-3-sulfopropane salt, glycidyl trimethyl ammonium chloride salt, and 1-chloro-2-hydroxypropane-3-trimethyl ammonium chloride salt; and still more preferably one or more etherification agents selected from the group consisting of ethylene oxide, propylene oxide, glycidol, chloroacetic acid, sodium chloroacetate salt, glycidyl trimethyl ammonium chloride salt, and 1-chloro-2-hydroxypropane-3-trimethyl ammonium chloride salt.

21. The method for producing the cellulose ether according to any of 15 to 20, wherein the use amount of the etherification agent is 0.001 or more by mol, preferably 0.005 or more by mol, more preferably 0.01 or more by mol, or still more preferably 0.1 or more by mol, and 50 or less by mol, preferably 10 or less by mol, more preferably 5 or less by mol, or still more preferably 3 or less by mol, relative to total 1 mol of the anhydroglucose unit of the cellulose and of the anhydroglucose unit of the alkali cellulose in the mixture containing the alkali cellulose produced by the method according to any of 1 to 14.

22. The method for producing the cellulose ether according to any of 15 to 21, wherein the alkali cellulose and the esterification agent are reacted in the presence of a non-aqueous solvent the amount of which is 1% or more by mass, preferably 5% or more by mass, more preferably 10% or more by mass, or still more preferably 12% or more by mass, and 100% or less by mass, preferably 70% or less by mass, more preferably 50% or less by mass, or still more preferably 30% or less by mass, relative to the cellulose in the cellulose-containing raw material.

23. The method for producing the cellulose ether according to 22, wherein the non-aqueous solvent is one or more kinds selected from the group consisting of a secondary or a tertiary lower alcohol having 3 to 4 carbon atoms, a ketone having 3 to 6 carbon atoms, an ether, and a non-protonic polar solvent; preferably one or more kinds selected from the group consisting of tert-butanol, isopropanol, tetrahydrofuran, ethylene glycol dimethyl ether, and acetonitrile; more preferably one or more kinds selected from the group consisting of tert-butanol, isopropanol, and ethylene glycol dimethyl ether.

24. The method for producing the cellulose ether according to any of 15 to 23, wherein reaction temperature in the etherification reaction is 0° C. or higher, preferably 20° C. or higher, or more preferably 30° C. or higher, and 200° C. or lower, preferably 100° C. or lower, or more preferably 80° C. or lower.

25. The method for producing the cellulose ether according to any of 15 to 24, wherein reaction time in the esterification reaction is 0.1 or more hours, preferably 0.2 or more hours, more preferably 0.5 or more hours, or still more preferably 1 or more hours, and 72 or less hours, preferably 36 or less hours, more preferably 18 or less hours, or still more preferably 12 or less hours.

EXAMPLES

In the following Examples, except for crystallinity (%), "%" means "% by mass" unless it is explicitly stated otherwise. In these Examples, content of the α-cellulose was used as the content of the cellulose in the raw material pulp (raw material cellulose). Amount of AGU in the alkali cellulose-containing powder mixture in the etherification step was calculated from the content of the α-cellulose and the charge amount in the etherification step.

Details of the measurement methods used in the Examples are collectively shown below.

(1) Calculation of α-Cellulose Content in the Raw Material Pulp

Content of the α-cellulose in the raw material pulp was calculated from the foregoing calculation equation (1) by using the analysis values (S18 @20° C. (ISO 692) and S10 @20° C. (ISO 692)).

Content of the α-cellulose in the pulp in the chip form after drying was calculated from the value obtained in the above measurement and amount of the removed water during drying.

(2) Calculation of Crystallinity

Crystallinity of pulp cellulose in each Example and Comparative Example was calculated according to the foregoing calculation equation (2) by measuring the X-ray diffraction intensity of the respective pulps by using the Rigaku RINT 2500VC X-RAY diffractometer (manufactured by Rigaku Corp.) with the following conditions: X-ray source of Cu/Kα-radiation, tube voltage of 40 kV, tube currency of 120 mA, measurement range of 2θ=5 to 45°, and X-ray scanning speed of 10°/minute. The sample for the measurement was the pellet having the area of 320 mm² and the thickness of 1 mm prepared by compression.

(3) Measurement of Amount of Water

Measurement of amount of water in the pulp was done by using the infrared moisture determination balance FD-610 (trade name, manufactured by Kett Electric Laboratory, Co., Ltd.). Measurement was done at 120° C.; and the end point was obtained when the mass change rate during the period of 30 seconds became 0.1% or less. The measured value of the water amount was converted to "% by mass" relative to the raw material cellulose in the pulp; and this was taken as the amount of water in the pulp.

Amount of water during pulverization in Step 1 was measured in the same way as those followed in the measurement of water amount in the pulp as mentioned above except that the cellulose powder mixture after completion of pulverization was used in place of the pulp as the measurement sample. The measured value of the water amount was converted to "% by mass" relative to the raw material cellulose in the pulp; and this value was taken as the amount of water during pulverization.

(4) Measurement of Bulk Density of the Cellulose Powder Mixture

The measurement was made by using Powder Tester (manufactured by Hosokawa Micron Corp.). The sample was dropped through a chute while vibrating a sieve so as to be collected in a prescribed vessel (100-mL volume); and then, the bulk density was calculated by measuring the weight of the sample in the vessel. However, as to the cotton-like sample, it was dropped through a chute without passing through the sieve so as to be collected in a prescribed vessel (100-mL volume); and then, the bulk density was calculated by measuring the weight of the sample in the vessel.

(5) Measurement of Median Diameter of the Powder Cellulose

The median diameter of the powder cellulose was measured by using the laser/diffraction scattering particle distribution analyzer LA-920 (trade name, manufactured by Horiba Ltd.) while dispersing the cellulose powder mixture in ethanol. Specifically, before measurement of the median diameter, the cellulose powder mixture was added into ethanol such that the concentration after the addition might become 70 to 95% as the transmittance thereof, and then it was dispersed by ultrasonic treatment; and after dissolution of sodium hydroxide (NaOH) and dispersion of the powder cellulose, measurement was done.

(6) Calculation of Conversion Index to the Alkali Cellulose

Calculation of conversion index to the alkali cellulose in Examples 1 to 11 and Comparative Examples 1 to 6:

From the alkali cellulose-containing powder mixture obtained by adding and mixing the cellulose powder mixture with water, 1 g of the sample was taken; and then, after this sample was allowed to stand statically in a sealed vessel at room temperature for one hour, the intensity of the X-ray diffraction was measured. The conversion index was calculated according to the before-mentioned calculation equation (3) by using this measurement result.

Procedures of the X-ray diffraction intensity measurement were the same as those described in the foregoing "(2) Calculation of crystallinity" except that the used sample was the alkali cellulose-containing powder mixture in place of the pulp. Calculation of the conversion index to the alkali cellulose in Examples 12 to 16:

Calculation of the conversion index to the alkali cellulose in Examples 12 to 16 was done in the same way as Example 1 except that the X-ray diffraction intensity measurement was done within 10 minutes after completion of the aging.

(7) Calculation of Introduction Amount of the Substitution Group (7-1) Calculation of Introduction Amount of the Substitution Group in the Cationized Hydroxypropyl Cellulose The average number of the cationic functional group introduced into the cationized hydroxypropyl cellulose obtained by the production method of the present invention (hereinafter this cellulose, i.e., the cellulose ether obtained by reacting a cellulose with propylene oxide and 3-chloro-2-hydroxypropyltrimethyl ammonium chloride, is sometimes referred to as "C-HPC") relative to the AGU that constitutes the cellulose skeleton which is the main chain of C-HPC (hereinafter, this average number is sometimes referred to as "substitution degree of the cationic group"), and the average number of the propyleneoxy group introduced into C-HPC relative to the AGU that constitutes the main chain of C-HPC (hereinafter, this average number is sometimes referred to as "substitution degree of the propyleneoxy group") were obtained from the values measured according to the method for analysis of the hydroxypropyl cellulose described in the Japanese Pharmacopoeia (15th revision) except that the measurement value of the chlorine element amount was obtained by the elemental analysis and that the subject of the analysis was not the hydroxypropyl cellulose but C-HPC.

Specifically, after the aqueous solution of C-HPC obtained in the respective Examples was purified by a dialysis membrane (molecular weight cut off of 1000), this aqueous solution was freeze-dried to obtain the purified C-HPC. The chlorine element amount (%) in the obtained C-HPC was measured by the elemental analysis, and the amount of the cationic group ($a$ (mol/g)) contained in the C-HPC unit mass was calculated from the following calculation equation (4) with the assumption that the number of the cationic group contained in the purified C-HPC is approximately equal to the number of the chloride ion which is the counter ion of the cationic group.

$$a \text{ (mol/g)} = \text{chlorine content obtained by elemental analysis (\%)}/(35.5 \times 100) \tag{4}$$

Then, amount of the hydroxypropoxy group (%) in the purified C-HPC was measured according to "the analysis method of the hydroxypropyl cellulose" described in the Japanese Pharmacopoeia (15th revision) except that the subject of the analysis was not the hydroxypropyl cellulose but the purified C-HPC. The amount of the hydroxypropoxy group ($b$ (mol/g)) (equation weight of —OC$_3$H$_6$OH is 75.09) was calculated from the following calculation equation (5).

$$b \text{ (mol/g)} = \text{hydroxypropoxy group content (\%) obtained by gas chromatography analysis}/(75.09 \times 100) \tag{5}$$

From the obtained a, b, and the following calculation equations (6) and (7), the substitution degree of the cationic group of C-CPC (k) and the substitution degree of the propyleneoxy group (m) were calculated.

$$a = k/(162 + k \times 151.5 + m \times 58) \tag{6}$$

$$b = m/(162 + k \times 151.5 + m \times 58) \tag{7}$$

(In the equations, k shows the substitution degree of the cationic group of C-HPC, and m shows the substitution degree of the propyleneoxy group.)

(7-2) Calculation of Substitution Degree of the Ethyleneoxy Group of the Hydroxyethyl Cellulose The average number of the ethyleneoxy group present in the hydroxyethyl cellulose obtained by the production method of the present invention (hereinafter this cellulose is sometimes referred to as "HEC") relative to the AGU that constitutes the cellulose skeleton which is the main chain of HEC (hereinafter, this average number is sometimes referred to as "substitution degree of the ethyleneoxy group") was obtained according to "the analysis method of the hydroxypropyl cellulose" described in the Japanese Pharmacopoeia (15th revision) except that the subject of the analysis was not the hydroxypropyl cellulose but HEC, that the calibration curve was obtained by using not propyl iodide but ethyl iodide, and that ethyl iodide was quantitatively analyzed in place of propyl iodide. The substitution degree was calculated from the content of the hydroxyethoxy group (%) in the purified HEC obtained.

(7-3) Calculation of Substitution Degree of the Carboxymethyl Group of the Carboxymethyl Cellulose The average number of the carboxymethyl group present in the carboxymethyl cellulose obtained by the production method of the present invention (hereinafter this cellulose is sometimes referred to as "CMC") relative to the AGU that constitutes the cellulose skeleton which is the main chain of CMC (hereinafter, this average number is sometimes referred to as "substitution degree of the carboxymethyl group") was measured by the following method.

It is considered that all carboxymethyl groups present in CMC obtained in Examples of the present invention form the sodium salt thereof and that the by-produced salt formed by the reaction and the neutralization is removed by purification. Accordingly, the measured number of the sodium contained in CMC after purification and drying is considered to be the number of the carboxymethyl group; and thus, the substitution degree of the carboxymethyl group was calculated from this number.

Specifically, after a CMC sample after purification and drying was decomposed by the wet method with sulfuric acid-hydrogen peroxide by using the microwave wet-type ashing apparatus A-300 (trade name, manufactured by Societe Prolabo), the Na content (%) was measured by the atomic absorption spectrometer Z-6100 (trade name, manufactured by Hitachi, Ltd.); and then, the substitution degree was calculated by the following equation (8).

$$\text{Substitution degree } (DS) = (162 \times \text{Na Content (\%)})/(2300 - 80 \times \text{Na Content (\%)}) \tag{8}$$

(In the equation (8), 162 shows the molecular weight of 1 mol of the anhydroglucose; and 2300 shows the value obtained by multiplying the atomic weight of sodium by 100 so as to give the percentage. The value 80 shows the increase in the molecular weight by substituting the hydrogen of the cellulose hydroxyl group with the carboxymethyl group (sodium salt)).

(8) Measurement of Average Degree of Polymerization (Copper-Ammonia Method)

(8-1) Measurement of Viscosity-Average Degree of Polymerization of the Pulp

The viscosity-average degree of polymerization of the cellulose in the pulp used as the cellulose-containing raw material in each Example and Comparative Example was measured by the method shown below.

(i) Preparation of Measurement Solution:

Into a measuring flask (100 mL) were taken 0.5 g of cuprous chloride and 20 to 30 mL of 25% aqueous ammonia solution; and after complete dissolution, 1.0 g of cupric hydroxide was added, and then 25% aqueous ammonia solution was added to somewhere before reaching the marked line of the measuring flask. The resulting mixture was stirred for 30 to 40 minutes for complete dissolution. Thereafter, the precisely weighed pulp (this was dried at 105° C. and 20 kPa for 12 hours) was added, and then the foregoing aqueous ammonia solution was added to the marked line of the measuring flask. After the flask was stoppered so as not to be invaded with an air, it was stirred by a magnetic stirrer for 12 hours for dissolution. Measurement solutions having different concentrations of the pulp were prepared similarly to the above by changing the charge amount of the pulp in the range of 20 to 500 mg.

(ii) Measurement of Viscosity-Average Degree of Polymerization:

Measurement solution (copper-ammonia aqueous solution) obtained in the above-described (i) was charged into the Ubbelohde viscometer; and after it was allowed to stand statically in a constant temperature cabinet (20±0.1° C.) for 1 hour, the dropping rate of the liquid was measured. From the dropping time (t seconds) of the copper-ammonia solution having various pulp concentrations (g/dL) and the dropping time ($t_0$ seconds) of the copper-ammonia aqueous solution without addition of the pulp, reduced viscosity ($\eta_{sp}/c$) at each concentration was obtained by the following equation.

$$\eta_{sp}/c=(t/t_0-1)/c$$

(In the equation, c represents the pulp concentration (g/dL).)

Further, the reduced viscosity was extrapolated to c=0 to obtain the intrinsic viscosity [η] (dL/g), and the viscosity-average degree of polymerization ($DP_v$) was obtained from the following equation.

$$DP_v=2000\times[\eta]$$

(In the equation, 2000 is an intrinsic coefficient for the cellulose.)

(8-2) Measurement of Viscosity-Average Degree of Polymerization of the Alkali Cellulose and the Cellulose in the Alkali Cellulose-Containing Powder Mixture The viscosity-average degree of polymerization of the alkali cellulose and the cellulose in the alkali cellulose-containing powder mixture obtained in each Example or Comparative Example was calculated by the procedure similar to that used in the foregoing (8-1) Measurement of viscosity-average degree of polymerization of the pulp after the alkali cellulose was converted to the purified cellulose by the method described below.

(iii) Method for Converting to the Purified Cellulose:

After 1 g of the alkali cellulose-containing mixture obtained in each Example and Comparative Example was dispersed into 50 mL of water and then neutralized by acetic acid, a solid cellulose was obtained by the centrifugal solid-liquid separation at 3000 rpm (2000×g) for 1 minute. The operation that the obtained solid cellulose was dispersed into 50 mL of water followed by the centrifugal solid-liquid separation was repeated for three times; and further, the centrifugal solid-liquid separation was done by dispersing the solid cellulose into 50 mL of acetone. After the solid thereby obtained was dried under the reduced pressure of 20 kPa at 105° C. for 12 hours, the purified cellulose was obtained.

(8-3) Measurement of Viscosity-Average Degree of Polymerization of the Cellulose Ether (iv) Preparation of Measurement Solution:

The measurement solution was prepared in the similar manner to that in the foregoing (i) Preparation of measurement solution, except that precisely weighed C-HPC, HEC, or CMC was used in place of the precisely weighed pulp.

(v) Measurement of Viscosity-Average Degree of Polymerization:

The measurement was done in the similar manner to that in the foregoing (ii) Measurement of the viscosity-average degree of polymerization, except that the cellulose-converted concentration (g/dL) was used as the concentration of the measurement solution. Here, the cellulose-converted concentration ($C_{cell}$) means the mass (g) of the cellulose skeleton portion contained in 1 dL of the measurement solution, and it can be defined by the following calculation equation (9).

$$C_{cell}=u\times162/(162+k\times151.5+m\times58+p\times44+q\times81) \quad (9)$$

(In the equation, u shows the mass (g) of C-HPC, HEC, or CMC precisely weighed at the time of preparation of the measurement solution; k and m show the substitution degree of the cationic group and the substitution degree of the propyleneoxy group obtained by the calculation equations (6) and (7), respectively; p shows the substitution degree of the ethyleneoxy group; and q shows the substitution degree of the carboxymethyl group, wherein p=q=0 when C-HPC is measured, k=m=q=0 when HEC is measured, and k=m=p=0 when CMC is measured.)

(9) Measurement of Water Soluble Fraction of the Cellulose Ether

Into a 50-mL screw tube were weighed 49.5 g of ion-exchanged water and 0.5 g of purified C-HPC, HEC, or CMC; and then, the resulting mixture was stirred by a magnetic stirrer for 12 hours for dissolution. This solution was transferred to a 50-mL centrifugally depositing tube and then centrifugally separated at 3000 rpm (2000×g) for 20 minutes. The supernatant solution (5 mL) was dried under reduced pressure (105° C., for 3 hours) to obtain the mass of the solid portion; and the water soluble fraction was calculated from the following equation (10).

$$\text{Water soluble fraction (\%)}=(\text{mass of the solid portion (g) in 5 mL of the supernatant}\times10/\text{sample mass})\times100 \quad (10)$$

Example 1

Production of Alkali Cellulose

Wooden pulp in the sheet form (Biofloc HV+ (1500 as the average degree of polymerization, 93.0% as the content of the α-cellulose, 65% as the crystallinity, and 7.0% as the water content), manufactured by Tembec Inc.) was changed to the chip form having the size of 3 to 5 mm square by cutting with the sheet pelletizer SGG-220 (manufactured by Horai Co., Ltd.).

The obtained pulp in the chip form (500 g) was dried in the vacuum dryer VO-320 (trade name, manufactured by Advantec Toyo Kaisha, Ltd.) at 20 kPa and 105° C. in the nitrogen stream for 2 hours to obtain the dried pulp in the chip form having 1500 as the average degree of polymerization, 96.4% as the content of the α-cellulose, 65% as the crystallinity, and 3.6% as the water content.

Step 1:

The dried pulp in the chip form obtained as mentioned above (100 g) and 23.8 g of sodium hydroxide (Tosoh Pearl (trade name), granules with the average granule diameter of 0.7 mm, manufactured by Tosoh Corp.; this amount corresponds to 1.0 mol relative to 1 mol of AGU) were charged into the batch-type vibrating mill MB-1 (total volume of 3.5 liters with 13 rods made of SUS 304 having a circular cross section form with φ of 30 mm, the rod length of 218 mm, and the filling ratio of 57%, manufactured by Chuo Kakohki Co., Ltd.); and then, pulverization was carried out for 15 minutes (vibration number of 20 Hz, vibration amplitude of 8 mm, and temperature of 30 to 70° C.) to obtain the cellulose powder mixture (1) (250 kg/m³ as the bulk density and 65.3 μm as the median diameter of the cellulose powder).

Step 2:

The obtained cellulose powder mixture (1) was transferred to a mortar; and then, to this was sprayed 25.4 g of water such that the water content in the cellulose powder mixture became 30% relative to the raw material cellulose. This mixture was mixed by using a pestle at 20° C. for 5 minutes to obtain the alkali cellulose-containing powder mixture (1) (0.88 as the conversion index to the alkali cellulose and 1179 as the average degree of polymerization of the alkali cellulose and the cellulose). The results are shown in Table 1.

Examples 2 to 10

Production of Alkali Cellulose

The same procedures as Example 1, except that the raw material pulp used in Step 1, the dried pulp in the chip form, the charge amount of NaOH, the pulverization time, and the charge amount of water in Step 2 were changed as shown in Table 1, were followed to obtain the alkali cellulose-containing powder mixtures (2) to (10). The results are shown in Table 1.

Example 11

Step 1:
The same procedure as Example 1, except that 106.2 g of the pulp in the chip form containing 10% of water which was obtained by adding 6.2 g of water to 100 g of the dried pulp in the chip form obtained in Example 1 was used as the raw material in Step 1, and that the pulverization time was changed to 12 minutes, was followed to obtain the cellulose powder mixture.
Step 2:
The same procedure as Example 1, except that 19.3 g of water was sprayed such that the water content in the cellulose powder mixture became 30% relative to the raw material cellulose, was followed to obtain the alkali cellulose-containing powder mixture (11). The results are shown in Table 1.

Comparative Examples 1 and 2

Preparation of Alkali Cellulose: Effect of Water Content in Step 2

The same procedures as Example 1, except that the raw material pulp, the dried pulp in the chip form used in Step 1, the pulverization time, and the charge amount of water in Step 2 were changed as shown in Table 1, were followed to obtain the alkali cellulose-containing powder mixtures (17) and (18). The results are shown in Table 1.

Comparative Example 3

Production of Alkali Cellulose: Effect of Particle Diameter of the Powder Cellulose after Pulverization The same procedure as Example 9, except that the pulverization time in Step 1 was changed, was followed to obtain the alkali cellulose-containing powder mixture (19). The results are shown in Table 1.

Comparative Examples 4 and 5

Production of Alkali Cellulose: Effect of Amount of the Basic Compound During Pulverization The same procedures as Example 10, except that the amount of NaOH in Step 1 was changed, and that on top of this, the pulverization time was changed in Comparative Example 5, were followed to obtain the alkali cellulose-containing powder mixtures (20) and (21). The results are shown in Table 1.

Comparative Example 6

Production of Alkali Cellulose: Effect of Amount of Water During Pulverization

Step 1:
The same procedure as Step 1 of Example 1, except that 125.5 g of the pulp in the chip form containing 30% of water which was obtained by adding 25.5 g of water to 100 g of the dried pulp in the chip form obtained in Example 1 was used as the raw material in Step 1, and that the pulverization time was changed to 32 minutes, was followed.
Step 2:
The same procedure as Step 2 of Example 1, except that water was not added in Step 2, was followed to obtain the alkali cellulose-containing powder mixture (22). The results are shown in Table 1.

TABLE 1

| | Step 1 | | | | | | | |
|---|---|---|---|---|---|---|---|---|
| | Dried pulp in the chip form | | NaOH | | During pulverization | | Cellulose powder mixture | |
| | Pulp*1 | Charge amount (g) | Charge amount (g) | (mol)*2 | Water content (%)*3 | Pulverization time (min) | Median diameter of powder cellulose (μm) | Bulk density (kg/m3) |
| Example 1 | No. 1 | 100 | 23.8 | 1.0 | 3.6 | 15 | 65 | 250 |
| Example 2 | No. 1 | 100 | 23.8 | 1.0 | 3.6 | 12 | 76 | 270 |
| Example 3 | No. 1 | 100 | 23.8 | 1.0 | 3.6 | 15 | 66 | 280 |
| Example 4 | No. 1 | 100 | 23.8 | 1.0 | 3.6 | 15 | 65 | 270 |
| Example 5 | No. 1 | 100 | 23.8 | 1.0 | 3.6 | 15 | 65 | 240 |
| Example 6 | No. 2 | 100 | 23.8 | 1.0 | 3.6 | 22 | 113 | 380 |
| Example 7 | No. 1 | 100 | 19.0 | 0.8 | 3.6 | 12 | 150 | 350 |
| Example 8 | No. 1 | 100 | 35.7 | 1.5 | 3.6 | 15 | 65 | 210 |
| Example 9 | No. 1 | 100 | 19.0 | 0.8 | 3.6 | 20 | 101 | 400 |
| Example 10 | No. 1 | 100 | 16.7 | 0.7 | 3.6 | 22 | 114 | 500 |
| Example 11 | No. 1 | 100 | 23.8 | 1.0 | 10.0 | 12 | 112 | 320 |
| Comparative Example 1 | No. 3 | 100 | 23.4 | 1.0 | 5.1 | 12 | 65 | 290 |
| Comparative Example 2 | No. 1 | 100 | 23.8 | 1.0 | 3.6 | 12 | 76 | 270 |
| Comparative Example 3 | No. 1 | 100 | 19.0 | 0.8 | 3.6 | 8 | 188 | 240 |

TABLE 1-continued

| | | | | | | | | |
|---|---|---|---|---|---|---|---|---|
| Comparative Example 4 | No. 1 | 100 | 11.9 | 0.5 | 3.6 | 22 | 92 | 300 |
| Comparative Example 5 | No. 1 | 100 | 11.9 | 0.5 | 3.6 | 15 | 129 | 250 |
| Comparative Example 6 | No. 1 | 100 | 23.8 | 1.0 | 30.0 | 32 | 149 | 630 |

| | Step 2 | | Alkali cellulose-containing powder mixture | | |
|---|---|---|---|---|---|
| | | Water | | | |
| | Charge amount of water (g) | content after its addition (%)*3 | No. | Average degree of polymerization*4 | Conversion index to alkali cellulose |
| Example 1 | 25.4 | 30 | (1) | 1179 | 0.88 |
| Example 2 | 25.4 | 30 | (2) | 1272 | 0.88 |
| Example 3 | 35.1 | 40 | (3) | 1383 | 0.96 |
| Example 4 | 44.7 | 50 | (4) | 1222 | 0.97 |
| Example 5 | 73.6 | 80 | (5) | 1241 | 0.92 |
| Example 6 | 25.4 | 30 | (6) | 765 | 0.97 |
| Example 7 | 25.4 | 30 | (7) | 1068 | 0.80 |
| Example 8 | 25.4 | 30 | (8) | 1265 | 1.00 |
| Example 9 | 25.4 | 30 | (9) | 1198 | 0.85 |
| Example 10 | 25.4 | 30 | (10) | 1037 | 0.82 |
| Example 11 | 19.3 | 30 | (11) | 1228 | 0.93 |
| Comparative Example 1 | 18.9 | 25 | (17) | 1259 | 0.71 |
| Comparative Example 2 | 141.1 | 150 | (18) | 1265 | 0.69 |
| Comparative Example 3 | 25.4 | 30 | (19) | 1340 | 0.67 |
| Comparative Example 4 | 25.4 | 30 | (20) | 1043 | 0.66 |
| Comparative Example 5 | 25.4 | 30 | (21) | 1309 | 0.49 |
| Comparative Example 6 | 0.0 | 30 | (22) | 759 | 0.93 |

*1No. 1 to 3: Different lots of Bioflock HV+ (trade name, manufactured by Tembec Inc.) were chipped and dried by the same procedure as EXAMPLE 1.
No. 1: 65% of crystallinity, 1500 of average degree of polymerization, 96.4% of a-cellulose content, and 3.6% of water content (vs. raw material cellulose)
No. 2: 74% of crystallinity, 1253 of average degree of polymerization, 96.4% of a-cellulose content, and 3.6% of water content (vs. raw material cellulose)
No. 3: 74% of crystallinity, 1407 of average degree of polymerization, 94.9% of a-cellulose content, and 5.1% of water content (vs. raw material cellulose)
*2Relative to 1 mol AGU in the raw material cellulose
*3Relative to the raw material cellulose (%)
*4Average degree of polymerization of the alkali cellulose and the cellulose in the alkali cellulose-containing powder mixture Example 12

Production of Alkali Cellulose

The same procedure as Step 1 and Step 2 of Example 1, except that the pulverization time in Step 1 and the charge amount of water in Step 2 were changed to the values shown in Table 2, was followed to obtain the alkali cellulose powder mixture.

Aging:

Thereafter, 1 g was taken from the obtained alkali cellulose-containing powder mixture into the 50-mL screw tube No. 7 (trade name, manufactured by Maruemu Corp.); and then, after the air therein was replaced with nitrogen, it was tightly stoppered and then aged in a constant temperature bath at 40° C. for 1 hour to obtain the alkali cellulose-containing powder mixture (12).

The average degree of polymerization of the alkali cellulose and the cellulose in the obtained powder mixture as well as the conversion index to the alkali cellulose is shown in Table 2.

Examples 13 to 15

Production of Alkali Cellulose

The same procedures as Example 12, except that the temperature and the time during the aging were changed to the values as shown in Table 2, were followed to obtain the alkali cellulose-containing powder mixtures (13) to (15). The results are shown in Table 2.

Example 16

Production of Alkali Cellulose

The same procedure as Step 1 and Step 2 of Example 1, except that the time of pulverization in Step 1 and the charge amount of water in Step 2 were changed to the values as shown in Table 2, was followed to obtain the alkali cellulose-containing powder mixture.

Aging:

Thereafter, the obtained alkali cellulose-containing powder mixture was taken into the pressure-tight ribbon mixer type reactor shown in FIG. 1 (volume of 1.1 liters, manufactured by Nitto Koatsu Co., Ltd.); and after the air therein was replaced with nitrogen, the temperature was raised to 60° C. The aging was carried out for 2 hours under the nitrogen atmosphere with stirring the mixture to obtain the alkali cellulose-containing powder mixture (16). The results are shown in Table 2.

ture thereof was raised to 40° C. with stirring; and then, 52.7 g of ethylene oxide (EO) was charged (this amount corresponds to 3.0 mol relative to 1 mol of AGU in the alkali cellulose-containing powder mixture) for 5 hours while maintaining the pressure therein at 0.05 MPa (gauge pres-

TABLE 2

| | Step 1 | | | | | | | |
|---|---|---|---|---|---|---|---|---|
| | Dried pulp in the chip form | | NaOH | | During pulverization | | Cellulose powder mixture | |
| | Pulp*1 | Charge amount (g) | Charge amount (g) | (mol)*2 | Water content (%)*3 | Pulverization time (min) | Median diameter of powder cellulose (μm) | Bulk density (kg/m3) |
| Example 12 | No. 1 | 100 | 23.8 | 1.0 | 3.6 | 12 | 76 | 270 |
| Example 13 | No. 1 | 100 | 23.8 | 1.0 | 3.6 | 12 | 76 | 270 |
| Example 14 | No. 1 | 100 | 23.8 | 1.0 | 3.6 | 12 | 76 | 270 |
| Example 15 | No. 1 | 100 | 23.8 | 1.0 | 3.6 | 12 | 76 | 270 |
| Example 16 | No. 1 | 100 | 23.8 | 1.0 | 3.6 | 12 | 65 | 270 |

| | Step 2 | | | | Alkali cellulose-containing powder mixture | | |
|---|---|---|---|---|---|---|---|
| | Water addition | | Aging | | Alkali cellulose mixed powder No. | Average degree of polymerization*4 | Conversion index to alkali cellulose |
| | Adding amount (g) | Water content after its addition (%)*3 | Temperature (° C.) | Time (hr) | | | |
| Example 12 | 29.3 | 34 | 40 | 1 | (12) | 1321 | 0.82 |
| Example 13 | 29.3 | 34 | 40 | 3 | (13) | 1274 | 0.86 |
| Example 14 | 29.3 | 34 | 60 | 1 | (14) | 1321 | 0.96 |
| Example 15 | 29.3 | 34 | 60 | 3 | (15) | 1274 | 1.00 |
| Example 16 | 35.1 | 40 | 60 | 2 | (16) | 1290 | 1.00 |

*1No. 1: Bioflock HV+ (65% of crystallinity, 1500 of average degree of polymerization, 96.4% of a-cellulose purity, and 3.6% of water content (vs. raw material cellulose), manufactured by Tembec Inc.)
*2Relative to 1 mol AGU in the raw material cellulose
*3Relative to the raw material cellulose (%)
*4Average degree of polymerization of the alkali cellulose and the cellulose in the alkali cellulose-containing powder mixture From the results shown in Tables 1 and 2, according to the production method of the present invention, it can be seen that the decrease in the degree of polymerization from the raw material cellulose can be suppressed, and that the alkali cellulose in the powder form having a high conversion index to the alkali cellulose can be obtained efficiently.

Example 17

Production of Hydroxyethyl Cellulose (HEC)

Into the pressure-tight ribbon mixer type reactor used in Example 16 was charged 100 g of the alkali cellulose-containing powder mixture (2) obtained in Example 2 (this was used after completion of Step 2 of Example 2 followed by allowing to stand statically it at room temperature for 1 hour). After the air therein was replaced with nitrogen, the temperasure) to carry out the reaction thereby obtaining the crude hydroxyethyl cellulose (HEC).

This crude HEC (10.0 g) was taken and neutralized by acetic acid. To obtain the substitution degree of the ethyleneoxy group, the neutralized solution was purified by using a dialysis membrane (molecular weight cut off of 1000); and then, this aqueous solution was freeze-dried to obtain the purified HEC.

As the result of analysis, the substitution degree of the ethyleneoxy group was 2.5; and thus, the yield based on the added EO was 83%. The water soluble fraction of the purified HEC thus obtained was 93.4%.

Examples 18 to 21

Production of HEC

The same procedures as Example 17, except that the alkali cellulose-containing powder mixture (4), (5), (8), or (9)

obtained in Examples 4, 5, 8, or 9 was used in place of the alkali cellulose-containing powder mixture (2), and that amounts of the used alkali cellulose-containing powder mixtures and EO were changed to the values as shown in Table 3, were followed to obtain the purified HEC. The results are shown in Table 3.

Example 22

Production of HEC

The same procedure as Example 17, except that the alkali cellulose-containing powder mixture (16) obtained in Example 16 (immediately after aging) was used in place of the alkali cellulose-containing powder mixture (2), and that amounts of the used alkali cellulose-containing powder mixture and EO were changed to the values as shown in Table 3, was followed to obtain the purified HEC. The results are shown in Table 3.

Comparative Example 7

Production of HEC: Effect of Amount of the Basic Compound During Pulverization

The same procedure as Example 17, except that 134 g of the alkali cellulose-containing powder mixture (21) obtained in Comparative Example 5 was used in place of 100 g of the alkali cellulose-containing powder mixture (2), and that 76.7 g of EO was used (this amount corresponds to 3.0 mol relative to 1 mol of AGU), was followed to obtain the purified HEC. The results are shown in Table 3.

Comparative Example 8

Production of HEC: Effect of Amount of Water in Step 2

Production of Alkali Cellulose:
Wooden pulp in the sheet form (Biofloc HV+ (1407 as the average degree of polymerization, 93.0% as the content of the α-cellulose, 74% as the crystallinity, and 7.0% as the water content), manufactured by Tembec Inc.) was changed to the chip form having the size of 3 to 5 mm square by cutting with the sheet pelletizer SGG-220 (manufactured by HORAI CO, LTD.).

The obtained pulp in the chip form (500 g) was dried in the vacuum dryer VO-320 (trade name, manufactured by Advantec Toyo Kaisha, Ltd.) at 20 kPa and 105° C. in the nitrogen stream for 2 hours to obtain the dried pulp in the chip form having 1407 as the average degree of polymerization, 94.9% as the content of the α-cellulose, 74% as the crystallinity, and 5.1% as the water content.

Step 1:
The same procedure as Step 1 in Example 1 was followed by using the dried pulp in the chip form obtained in the above-mentioned procedure to obtain the cellulose powder mixture (23) (290 kg/m$^3$ as the bulk density and 64.5 μm as the median diameter of the cellulose powder).

Step 2:
The obtained cellulose powder mixture (23) was transferred to a mortar; and then, to this was sprayed 94.5 g of water such that the water content in the cellulose powder mixture became 105% relative to the raw material cellulose. This mixture was mixed by using a pestle at 20° C. for 5 minutes to obtain the alkali cellulose-containing powder mixture (23).

TABLE 3

| | Raw material | | Etherification agent | | | Hydroxyethyl cellulose | | |
| --- | --- | --- | --- | --- | --- | --- | --- | --- |
| | Alkali cellulose-containing powder mixture No. | Charge amount (g) | Reaction agent*1 | Charge amount (g) | (mol)*2 | Substitution degree of ethyleneoxy group | Water soluble fraction (%) | Yield (%)*3 |
| Example 17 | (2) | 100 | EO | 52.7 | 3 | 2.5 | 93.4 | 83 |
| Example 18 | (4) | 100 | EO | 46.7 | 3 | 2.7 | 92.4 | 89 |
| Example 19 | (5) | 100 | EO | 39.8 | 3 | 2.3 | 79.6 | 77 |
| Example 20 | (8) | 157 | EO | 76.5 | 3 | 2.3 | 78 | 77 |
| Example 21 | (9) | 141 | EO | 76.7 | 3 | 2.7 | 85 | 90 |
| Example 22 | (16) | 100 | EO | 49.5 | 3 | 2.3 | 96 | 78 |
| Comparative Example 7 | (21) | 134 | EO | 76.7 | 3 | 2.4 | 43 | 80 |

*1 Ethylene oxide
*2 Relative to 1 mol AGU in the alkali cellulose-containing powder mixture
*3 Based on the added EO From the results shown in Table 3, it can be seen, in the cellulose ester obtained by the production method of the present invention, that the decrease in the degree of polymerization from the raw material cellulose is small, that the content of the salt is small because the use amount of the base is small, and that the water solubility is excellent. The reason of this increase in water solubility is not clear; but it may be assumed that this is caused by introduction of the hydrophilic substituent uniformly into entirety of the cellulose because it is shown that the alkali cellulose in the powder form of the present invention has a high conversion index to the alkali cellulose.

Step of Converting Reaction to the Hydroxyethyl:
Into the pressure-tight ribbon mixer type reactor used in Example 16 was charged 100 g of the alkali cellulose-containing powder mixture (23) obtained as mentioned above. After the air therein was replaced with nitrogen, the temperature thereof was raised to 40° C. with stirring; and then, 35.4 g of EO was charged (this amount corresponds to 3.0 mol relative to 1 mol of AGU in the alkali cellulose-containing powder mixture) for 8.5 hours while maintaining the pressure therein at 0.05 MPa (gauge pressure) to carry out the reaction thereby obtaining the crude hydroxyethyl cellulose (HEC). Thereafter, the same neutralization and purification procedures as Example 16 were followed to obtain the purified HEC. The substitution degree of the ethyleneoxy group was 1.6, and the yield based on the added EO was 53%. The water soluble fraction of the purified HEC thus obtained was 42%.

Example 23

Production of C-HPC

Wooden pulp in the sheet form (Biofloc HV+ (1481 as the average degree of polymerization, 93.0% as the content of the α-cellulose, 74% as the crystallinity, and 7.0% as the water content), manufactured by Tembec Inc.) was changed to the chip form having the size of 3 to 5 mm square by cutting with the sheet pelletizer SGG-220 (manufactured by HORAI CO, LTD.).

The obtained pulp in the chip form (500 g) was dried in the vacuum dryer VO-320 (trade name, manufactured by Advantec Toyo Kaisha, Ltd.) at 20 kPa and 105° C. in the nitrogen stream for 2 hours to obtain the dried pulp in the chip form having 1481 as the average degree of polymerization, 95.4% as the content of the α-cellulose, 74% as the crystallinity, and 4.6% as the water content.

Step 1:

The same procedure as Step 1 in Example 1 was followed by using the dried pulp in the chip form obtained in the above-mentioned procedure to obtain the cellulose powder mixture (24) (250 kg/m$^3$ as the bulk density and 65.3 μm as the median diameter of the cellulose powder).

Step 2:

The cellulose powder mixture (24) obtained in Step 1 was transferred to a mortar; and then, to this was sprayed 50 g of water such that the water content in the cellulose powder mixture became 57% relative to the raw material cellulose. This mixture was mixed by using a pestle at 20° C. for 5 minutes to obtain the alkali cellulose-containing powder mixture (24) (0.88 as the conversion index to the alkali cellulose, and 1172 as the average degree of polymerization of the alkali cellulose and the cellulose).

Step of Converting Reaction to the Hydroxypropyl:

The alkali cellulose-containing powder mixture (24) obtained in Step 2 mentioned above was charged into the kneader PNV-1 (volume of 1.0 liter, manufactured by IRIE SHOKAI Co., Ltd.) equipped with a reflux tube and a dropping funnel; and then, to this was added 102.7 g of propylene oxide (this amount corresponds to 3.0 mol relative to 1 mol of AGU in the alkali cellulose-containing powder mixture) to carry out the reaction with stirring at 50° C. for 9 hours. This reaction was carried out as follows: 34.2 g of propylene oxide was gradually added for 2 hours followed by aging at 50° C. for 1 hour, and this procedure was repeated for three times.

Step of the Cationization Reaction:

The reaction mixture (3 g) obtained in Step 3 mentioned above was taken to a mortar; and then, to this was added 0.95 g of 65% aqueous solution of 3-chloro-2-hydroxypropyl trimethyl ammonium chloride solution (manufactured by Yokkaichi Chemical Co., Ltd.) (this amount corresponds to 0.5 mol relative to 1 mol of AGU that constitutes the cellulose skeleton of the compound having the cellulose skeleton in the reaction mixture obtained by the converting reaction to the hydroxypropyl). After these were mixed for 5 minutes, the resulting mixture was transferred to the 50-mL screw tube No. 7 (trade name, manufactured by Maruemu Corp.); and then, after the air therein was replaced with nitrogen, the reaction was carried out at 50° C. for 7 hours to obtain the crude cationized hydroxypropyl cellulose (C-HPC).

This crude C-HPC (3.0 g) was taken and neutralized by lactic acid. To obtain the substitution degrees of the propyleneoxy group and the cationic group, the neutralized solution was purified by using a dialysis membrane (molecular weight cut off of 1000); and then, this aqueous solution was freeze-dried to obtain the purified C-HPC.

The elemental analysis of the purified C-HPC thus obtained showed that this contained 4.8% of the chlorine element and 33.5% of the hydroxypropyl group. The substitution degree of the propyleneoxy group was 1.3, and the substitution degree of the cationic group was 0.3. The results are shown in Table 4.

Example 24

Production of C-HPC

Step of Chipping:

The same procedure as Example 23 was followed to obtain the dried pulp in the chip form.

Step 1:

The dried pulp in the chip form obtained as mentioned above (920 g) and 158.9 g of sodium hydroxide (Tosoh Pearl (trade name), granules with the average granule diameter of 0.7 mm, manufactured by Tosoh Corp.; this amount corresponds to 0.7 mol relative to 1 mol of AGU) were charged into the batch-type vibrating rod mill FV-10 (trade name, total volume of 35 liters with 63 rods made of SUS 304 having a circular cross section form with the rod diameter of 30 mm, the rod length of 510 mm, and the filling ratio of 70%, manufactured by Chuoh Kakohki Co., Ltd.); and then pulverization was carried out for 30 minutes with vibration number of 20 Hz, vibration amplitude of 8 mm, and temperature of 10 to 40° C. to obtain the cellulose powder mixture (25) (333 kg/m$^3$ as the bulk density and 48.9 μm as the median diameter of the cellulose powder).

Step 2:

After 390.5 g of the cellulose powder mixture (25) obtained in the foregoing Step 1 was charged into the Loedige Mixer (volume of 5 liters, manufactured by Matsubo Corp.), it was sprayed with 110.9 g of water such that the water content in the cellulose powder mixture became 33% relative to the raw material cellulose while stirring the mixture at the stirring rate of 250 rpm for the main stirring blades and 2500 rpm for the chopper blades. After the inner temperature thereof was raised to 50° C., the aging was carried out for 2 hours with stirring to obtain the alkali cellulose-containing powder mixture (25) (0.78 as the conversion index to the alkali cellulose).

Step of Converting Reaction to the Hydroxypropyl:

Into the foregoing Loedige Mixer containing 501.4 g of the alkali cellulose-containing powder mixture obtained as mentioned above was charged 50 g of isopropanol (this amount is 15% relative to the raw material cellulose) as the non-aqueous solvent while stirring the mixture at 50 rpm for the main blades and 400 rpm for the chopper blades; and then, after it was stirred for 10 minutes, 250.6 g of propylene oxide was gradually added thereinto (this amount corresponds to 2.1 mol relative to 1 mol of AGU in the alkali cellulose-containing powder mixture) for 5 hours. After completion of the gradual addition, aging was carried out at 50° C. for 2 hours. After completion of the reaction, isopropanol was removed by distillation under reduced pressure.

Step of the Cationization Reaction:

The reaction mixture (398 g) obtained as mentioned above was charged into the high speed mixer FLFS-GS-2J (volume of 2 liters, manufactured by Fukae-Powtec. Co., Ltd.); and then, to this was sprayed 124.8 g of 65% aqueous solution of 3-chloro-2-hydroxypropyl trimethyl ammonium chloride solution (manufactured by Yokkaichi Chemical Co., Ltd.) (this amount corresponds to 0.4 mol relative to 1 mol of AGU that constitutes the cellulose skeleton of the compound having the cellulose skeleton in the reaction mixture obtained by the converting reaction to the hydroxypropyl) while stirring the mixture with the stirring rate of 528 rpm for the main blades and 1800 rpm for the chopper blades. After the reaction at 60° C. for 3 hours, the crude C-HPC was obtained.

Thereafter, this was neutralized by spraying lactic acid in the high speed mixer. To obtain the substitution degrees of the propyleneoxy group and the cationic group, the neutralized solution was purified by using a dialysis membrane (molecular weight cut off of 1000); and then, this aqueous solution was freeze-dried to obtain the purified C-HPC.

The substitution degree of the propyleneoxy group of the obtained C-HPC was 2.1 and the substitution degree of the cationic group was 0.4. The results are shown in Table 4.

Example 25

Production of C-HPC

The same procedure as Example 24, except that the non-aqueous solvent was not used in the step of converting reaction to the hydroxypropyl, was followed to obtain the purified C-HPC.

The substitution degree of the propyleneoxy group of the obtained C-HPC was 2.1 and the substitution degree of the cationic group was 0.4. The results are shown in Table 4.

Example 26

Production of Carboxymethyl Cellulose

Wooden pulp in the sheet form (Biofloc HV+ (1481 as the average degree of polymerization, 93.0% as the content of the α-cellulose, 74% as the crystallinity, and 7.0% as the water content), manufactured by Tembec Inc.) was changed to the chip form having the size of 3 to 5 mm square by cutting with the sheet pelletizer SGG-220 (manufactured by HORAI CO, LTD.).

The obtained pulp in the chip form (500 g) was dried in the vacuum dryer VO-320 (trade name, manufactured by Advantec Toyo Kaisha, Ltd.) at 20 kPa and 105° C. in the nitrogen stream for 2 hours to obtain the dried pulp in the chip form having 1481 as the average degree of polymerization, 95.4% as the content of the α-cellulose, 74% as the crystallinity, and 4.6% as the water content.

Step 1:

The dried pulp in the chip form obtained as mentioned above (100 g) and 24.1 g of sodium hydroxide (Tosoh Pearl (trade name), granules with the average granule diameter of 0.7 mm, manufactured by Tosoh Corp.; this amount corresponds to 1.05 mol relative to 1 mol of AGU) were charged into the batch-type vibrating mill MB-1 (total volume of 3.5 liters with 13 rods made of SUS 304 having a circular cross section form with φ of 30 mm, the rod length of 218 mm, and the filling ratio of 57%, manufactured by Chuoh Kakohki Co., Ltd.); and then, pulverization was carried out for 15 minutes (vibration number of 20 Hz, vibration amplitude of 8 mm, and temperature of 30 to 70° C.) to obtain the cellulose powder mixture (26) (260 kg/m$^3$ as the bulk density and 68.0 μm as the median diameter of the cellulose powder).

Step 2:

The cellulose powder mixture (26) obtained in Step 1 was transferred to a mortar; and then, to this was sprayed 65.1 g of water such that the water content in the cellulose powder mixture became 73% relative to the raw material cellulose. This mixture was mixed by using a pestle at 20° C. for 5 minutes to obtain the alkali cellulose-containing powder mixture (26) (0.98 as the conversion index to the alkali cellulose and 1235 as the average degree of polymerization of the alkali cellulose and the cellulose).

Step of Converting Reaction to the Carboxymethyl:

To this mortar was added 60.1 g of sodium monochloroacetic acid (this amount corresponds to 1.00 mol relative to 1 mol AGU in the alkali cellulose-containing powder mixture); and then, they were mixed by using a pestle at 20° C. for 5 minutes. The obtained mixture was charged into the kneader PNV-1 (trade name, volume of 1 liter, manufactured by Irie Shokai Co., Ltd.); and then, this was evacuated (about 50 kPa) and resumed to a normal pressure by nitrogen. This procedure of evacuation and resumption to a normal pressure by nitrogen was repeated for three times, so that the air therein was replaced by nitrogen. Thereafter, the temperature thereof was raised to 60° C.; and then, it was stirred for 3 hours. After 98% or more of the added monochloroacetic acid was confirmed to be consumed by HPLC, it was cooled to room temperature; and then, the product was taken out from the kneader. Then, after the product was dispersed into 1000 mL of 70% aqueous methanol, the excess sodium hydroxide was neutralized by adding 3.7 g of acetic acid. Then, to this was added 3000 mL of 70% aqueous methanol; and then, the resulting mixture was stirred to dissolve the by-produced salt, unreacted substances, and so on. The obtained slurry was filtrated by a filter paper (qualitative filter paper No. 2 (trade name), manufactured by Toyo Roshi Kaisha, Ltd., was used); and then, the cake after filtration was washed by 1000 mL of acetone and then dried under reduced pressure (about 70 kPa) at 60° C. in the nitrogen stream for 15 hours to obtain 127.6 g of CMC. The substitution degree of the carboxymethyl group in the obtained CMC was 0.64. The results are shown in Table 4.

TABLE 4

|  | Raw material | | | | Non-aqueous solvent | | | Etherification agent | |
|---|---|---|---|---|---|---|---|---|---|
|  | Alkali cellulose-containing powder mixture No. | Amount of the contained base (mol)*1 | Average degree of polymerization | Conversion index to alkali cellulose | Kind*2 | Charge amount (g) | (% by mass)*3 | Reaction agent*2 (mol) | Charge amount (mol)*1 |
| Example 23 | (24) | 1.0 | 1172 | 0.88 | — | | | PO/HAC | 3.0/0.5 |
| Example 24 | (25) | 0.7 | 1114 | 0.78 | IPA | 50 | 15 | PO/HAC | 2.1/0.4 |

TABLE 4-continued

| | | | | | | | |
|---|---|---|---|---|---|---|---|
| Example 25 | (25) | 0.7 | 1114 | 0.78 | — | PO/HAC | 2.1/0.4 |
| Example 26 | (26) | 1.05 | 1235 | 0.98 | — | Na monochloro-acetate | 1.00 |

| | Cellulose ether | | | | |
|---|---|---|---|---|---|
| | Substitution degree of propyleneoxy group | Substitution degree of cationic group | Substitution degree of carboxymethyl group | Water soluble fraction (%) | Yield (%)*4 |
| Example 23 | 1.3 | 0.30 | — | 83.5 | 43/60*5 |
| Example 24 | 1.5 | 0.27 | — | 79 | 72/68*5 |
| Example 25 | 1.3 | 0.18 | — | 67 | 64/45*5 |
| Example 26 | — | — | 0.64 | 86 | 64 |

*1Relative to 1 mol AGU in the alkali cellulose-containing powder mixture
*2PO: propylene oxide, HAC: 1-chloro-2-hydroxypropane-3-trimethyl ammonium chloride, and IPA: isopropanol
*3Relative to the raw material cellulose
*4Based on the added etherification agent
*5Yield based on the added PO/yield based on the added HAC From Table 4, it is clear that the cellulose ether having excellent water-solubility can be obtained by reacting various etherification agents with the alkali cellulose obtained by the production method of the present invention. In addition, it is clear that the cellulose ether having further excellent water solubility can be obtained by using a non-aqueous solvent during the reaction.

INDUSTRIAL APPLICABILITY

According to the production method of the present invention, an alkali cellulose having the decrease in the degree of polymerization of the raw material cellulose during production thereof suppressed can be produced efficiently with high productivity. In addition, a cellulose ether can be produced efficiently by using the obtained alkali cellulose. The cellulose ether thus obtained can be used as an ingredient for cleaning compositions such as a shampoo, a rinse, a treatment, and a conditioner; for cosmetic compositions such as a milky lotion and a cream; a softening composition for clothing; and so on. In addition, it can be used widely in the fields such as a polymer activating agent, a dispersing agent, an emulsifier, a modifier, a flocculant, and a viscosity controller.

EXPLANATION OF REFERENCE NUMERALS

1: Reactor
2: Stirring blades
3: Charging port of raw material
4: Charging port of ethylene oxide
5: Discharging port of ethylene oxide
6: Inlet port of heating medium
7: Outlet port of heating medium

The invention claimed is:

1. A method for producing an alkali cellulose comprising:
Step 1 wherein a cellulose-containing raw material of pulp, paper plant stem, and/or plant shells is pulverized in the presence of 0.6 to 1.5 mol of a basic compound relative to 1 mol of an anhydroglucose unit that constitutes a cellulose in the said cellulose-containing raw material and under the condition in which the water content therein relative to the cellulose in the cellulose-containing raw material is 0.01-10% by mass thereby obtaining a cellulose powder mixture having the median diameter of the cellulose-containing raw material made 10μm-150 μm wherein bulk density of the cellulose powder mixture at the conclusion of step 1 is in the range of 100 to 750 kg/m$^3$, and
Step 2 wherein water content in the cellulose powder mixture obtained in Step 1 is adjusted in the range of 30 to 100% by mass relative to the cellulose in the cellulose-containing raw material used in Step 1 by adding water to the cellulose powder mixture obtained in Step 1 thereby obtaining an alkali cellulose in the powder form.

2. The method for producing the alkali cellulose according to claim 1, further comprising a Step 3 wherein, after addition of water in Step 2, aging is carried out by increasing the temperature to 35 to 90° C. for the time period of 0.1 to 24 hours.

3. The method for producing the alkali cellulose according to claim 1, wherein the water content in the cellulose-containing raw material in Step 1 is in the range of 0.01-7% by mass relative to the cellulose.

4. The method for producing the alkali cellulose according to claim 1, wherein the basic compound is an alkaline metal hydroxide.

5. The method for producing the alkali cellulose according to claim 1, wherein a pulverizing machine used in Step 1 is a vessel-driven medium mill or a medium-stirring mill.

6. A method for producing a cellulose ether, further comprising the step wherein the alkali cellulose produced by the production method according to claim 1 is reacted with an etherification agent.

7. The method for producing the cellulose ether according to claim 6, wherein the alkali cellulose and the etherification agent are reacted in the presence of a non-aqueous solvent with the amount thereof being in the range of 1 to 100% by mass relative to the cellulose in the cellulose-containing raw material.

8. The method for producing the cellulose ether according to claim 6, wherein the etherification agent is one or more kinds selected from the group consisting of ethylene oxide, propylene oxide, glycidol, chloroacetic acid, sodium chloroacetate salt, glycidyl trimethyl ammonium chloride salt, and 1-chloro-2-hydroxypropane-3-trimethyl ammonium chloride salt.

9. A method for producing a cellulose ether, futher comprising:

reacting the alkali cellulose produced by the production method according to claim 1 with an etherification agent, wherein the amount of the etherification agent is in the range of 0.001 to 50 mol relative to total 1 mol of the anhydroglucose unit of the cellulose and of the anhydroglucose unit of the alkali cellulose in the alkali cellulose-containing mixture produced by the production method according to claim 1.

10. The method for producing the cellulose ether according to claim 7, wherein the non-aqueous solvent is selected from the group consisting of a secondary or a tertiary lower alcohol having 3 to 4 carbon atoms, a ketone having 3 to 6 carbon atoms, an ether, a non-protonic polar solvent and mixtures thereof.

11. The method for producing the alkali cellulose according to claim 1, wherein the average degree of polymerization of the cellulose in the cellulose-containing raw material in Step 1 is 100 to 10000.

12. The method for producing the alkali cellulose according to claim 1, wherein the crystallinity of the cellulose in the cellulose-containing raw material in Step 1 is 10% to 95%.

13. The method for producing the alkali cellulose according to claim 1, wherein the median diameter of the cellulose-containing raw material after pulverization in Step 1 is 20 μm-150 μm.

14. The method for producing the alkali cellulose according to claim 1, wherein amount of water during pulverization in Step 1 is 0.1-7% by mass.

* * * * *